United States Patent
Szablya

(10) Patent No.: US 12,309,672 B2
(45) Date of Patent: May 20, 2025

(54) METHOD FOR WIRELESS EVENT-DRIVEN EVERYTHING-TO-EVERYTHING (X2X) PAYLOAD DELIVERY

(71) Applicant: METROLLA INC., Kent, WA (US)

(72) Inventor: Adam Michael-Louis Szablya, Kent, WA (US)

(73) Assignee: METROLLA, INC., Kent, WA (US)

( * ) Notice: Subject to any disclaimer, the term of this patent is extended or adjusted under 35 U.S.C. 154(b) by 0 days.

(21) Appl. No.: 18/766,404

(22) Filed: Jul. 8, 2024

(65) Prior Publication Data

US 2024/0365092 A1    Oct. 31, 2024

Related U.S. Application Data

(63) Continuation of application No. 17/369,785, filed on Jul. 7, 2021, now Pat. No. 12,035,209.

(Continued)

(51) Int. Cl.
*H04W 4/38* (2018.01)
*H04L 41/0813* (2022.01)
(Continued)

(52) U.S. Cl.
CPC ........... *H04W 4/38* (2018.02); *H04L 41/0813* (2013.01); *H04L 41/22* (2013.01); *H04L 47/50* (2013.01);
(Continued)

(58) Field of Classification Search
CPC .......... H04W 52/0229; H04W 52/0235; H04B 11/00; G06F 3/167; G06F 9/4418;
(Continued)

(56) References Cited

U.S. PATENT DOCUMENTS 8,880,279 B2   11/2014   Plante
9,201,842 B2   12/2015   Plante
(Continued)

FOREIGN PATENT DOCUMENTS

CN   109213144 A   1/2019
CN   110427696 A   11/2019
(Continued)

OTHER PUBLICATIONS

Kongezos, et al., Wireless communication between A.G.V's (Autonomous Guided Vehicle) and the industrial network C.A.N. (Controller Area Network). Proceedings of the 2002 IEEE International Conference on Robotics & automation, Washington, D.C., May 2002 (4 pgs).

(Continued)

*Primary Examiner* — Jay P Patel
*Assistant Examiner* — Shehab A Alawdi
(74) *Attorney, Agent, or Firm* — R. Reams Goodloe, Jr.

(57) ABSTRACT

A computer-based system to improve data transfer rates between a server and stationary or moving devices having sensors. A sensor data ingestion device receives and process sensor data to place it in a form suitable for rapid download by the server. A memory buffer and a queue unit include computational circuitry configured to generate a queue status associated with triggering event data. The sensor data ingestion device may provide a queue modification procedure. A queue modification menu including a choice of one or more instances of priority levels may be provided by the server. Streaming messages are downloaded by the server using a persistent connection. Files may be configured as file chunks at the sensor data ingestion device. File chunks are received and reconfigured at the server into time layered files. Time layered files may include LiDAR point cloud data and GPS position data therein.

15 Claims, 13 Drawing Sheets

Related U.S. Application Data

(60) Provisional application No. 63/049,041, filed on Jul. 7, 2020.

(51) Int. Cl.
  *H04L 41/22*    (2022.01)
  *H04L 47/50*    (2022.01)
  *H04Q 9/00*     (2006.01)
  *H04W 4/40*     (2018.01)

(52) U.S. Cl.
  CPC .......... *H04Q 9/00* (2013.01); *H04Q 2209/40* (2013.01); *H04W 4/40* (2018.02)

(58) Field of Classification Search
  CPC ......... Y02D 30/70; G10L 15/22; G10L 15/02; G10L 2015/223
  See application file for complete search history.

(56) References Cited

U.S. PATENT DOCUMENTS

| | | |
|---|---|---|
| 9,208,129 B2 | 12/2015 | Plante |
| 9,300,321 B2 | 3/2016 | Zalik |
| 9,691,195 B2 | 6/2017 | Plante |
| 10,257,669 B2* | 4/2019 | Patel ............... G08B 17/00 |
| 10,541,738 B1 | 1/2020 | Harel et al. |
| 10,748,354 B2 | 8/2020 | Liu et al. |
| 10,798,617 B1 | 10/2020 | Ghadge et al. |
| 2003/0144775 A1 | 7/2003 | Klausner |
| 2004/0116124 A1 | 6/2004 | Lepschy |
| 2012/0105199 A1 | 5/2012 | Sanders |
| 2014/0241163 A1 | 8/2014 | Lee et al. |
| 2014/0334302 A1 | 11/2014 | Loach |
| 2015/0195835 A1 | 7/2015 | Lin et al. |
| 2015/0281288 A1 | 10/2015 | Levinson et al. |
| 2015/0348412 A1 | 12/2015 | Onishi |
| 2016/0292374 A1* | 10/2016 | Hutchins ............ H04L 67/12 |
| 2016/0345362 A1 | 11/2016 | Lee |
| 2017/0012883 A1 | 1/2017 | Tonguz et al. |
| 2017/0032591 A1 | 2/2017 | Plante |
| 2017/0035314 A1* | 2/2017 | Kronstedt ............ A61B 5/28 |
| 2018/0047107 A1 | 2/2018 | Perl |
| 2018/0077063 A1* | 3/2018 | Kurabayashi ........ A63F 13/352 |
| 2018/0081972 A1* | 3/2018 | Mohanbabu ....... H04L 63/0876 |
| 2018/0082516 A1 | 3/2018 | Kubajak |
| 2018/0088098 A1* | 3/2018 | Mandava ............ G01K 1/022 |
| 2018/0286146 A1 | 10/2018 | Liu et al. |
| 2018/0316606 A1 | 11/2018 | Sung et al. |
| 2018/0372875 A1* | 12/2018 | Juelsgaard .......... G01S 17/931 |
| 2018/0374238 A1 | 12/2018 | Park et al. |
| 2019/0138823 A1 | 5/2019 | Doria |
| 2019/0258251 A1 | 8/2019 | Ditty et al. |
| 2019/0272920 A1* | 9/2019 | Teplitzky ............. G06N 5/025 |
| 2019/0313271 A1 | 10/2019 | Yiu |
| 2020/0028928 A1* | 1/2020 | Gehlsen ............. H04L 67/141 |
| 2020/0029133 A1* | 1/2020 | Gehlsen ............. H04L 9/0863 |
| 2020/0059436 A1 | 2/2020 | Chen |
| 2020/0155025 A1* | 5/2020 | Smith .............. A61B 5/7264 |
| 2020/0259896 A1* | 8/2020 | Sachs ............. H04W 56/0065 |
| 2020/0265717 A1 | 8/2020 | Tonguz et al. |
| 2020/0285737 A1* | 9/2020 | Kraus ............. G06F 21/552 |
| 2020/0286377 A1 | 9/2020 | Tonguz et al. |
| 2020/0312063 A1 | 10/2020 | Balakrishnan |
| 2020/0396254 A1* | 12/2020 | Crabtree ............ H04L 63/20 |
| 2021/0064671 A1 | 3/2021 | Ramraj |
| 2021/0341508 A1* | 11/2021 | George ............ G01J 5/0025 |
| 2022/0230101 A1 | 7/2022 | Gahard |

FOREIGN PATENT DOCUMENTS

| | | |
|---|---|---|
| CN | 112600894 A | 4/2021 |
| EP | 2407943 A1 | 1/2012 |
| EP | 2002329 B1 | 12/2018 |
| GB | 2446994 | 8/2011 |
| WO | WO 00/77620 A2 | 12/2000 |
| WO | WO 2015/000692 A1 | 1/2015 |
| WO | WO 2019/027597 A1 | 2/2019 |

OTHER PUBLICATIONS

Shurpali, Role of Edge Computing In Connected and Autonomous Vehicles, Downloaded Jul. 1, 2021—Dated: Jan. 24, 2020. https://222.einfochips.com/blog/role-of-edge-computing-in-connected.and-autonomous-vehicles/ (6 pgs).

5G and Edge Computing. Unleashing the Power of Real Time. White paper. https://www.verizon.com/business/solutions/5g/edge-computing/5g-and-edge-computing/ Downloaded: Sep. 15, 2021 (5 pgs).

5GAA Automotive Association, White Paper C-V2X Use Cases, Methodology, Examples and Service Level Requirements. Jun. 19, 2019. (77 pgs).

Zhang, et al. Tracking a Duty-Cycled Autonomous Underwater Vehicle by Underwater Wireless Sensor Networks. IEEE Access, vol. 5. Published: Sep. 8, 2017. (17 pgs).

Tonguz, Ozan K. Red Light, Green Light—No Light, Tomorrow's communicative cars could take turns at intersections. IEEE Spectrum. Oct. 2018 (9pgs).

Zeng, Tengchan. Joint Communication and Control for Wireless Autonomous Vehicular Platoon Systems. IEEE Transactions on Communications, vol. 67, No. 11, Nov. 2019. (16 pgs).

Chidester, Augustus. Real World Experience With Event Data Recorders. National Highway Traffic Safety Administration. Paper No. 247. Proceedings of the 17th International Technical Conference on the Enhanced Safety of Vehicles (ESV) Conference, Amsterdam, Netherlands, Jun. 4, 2001. (11pgs).

What is V2X communication? Creating connectivity for the autonomous car era. Mar. 2018 Downloaded Feb. 19, 2021. https://www.zdnet.com/article/what-is-v2x-communication-creating-connectivity for-the-autonomous-car-era/ (17 pgs).

Gozalvez, Prof. Dr. Javier. Heterogeneous V2X Networks for Connected and Automated Vehicles. Universidad Miguel Hernandez de Elche, Spain. President IEEE Vehicular Technology Society. IEEE 5G Summit, Pretoria, S. Africa, May 6, 2019 (63 pgs).

5G Americas Whitepaper, Cellular V2X Communications Towards 5G. 5G Americas, Mar. 2018. (38 pgs).

Ivan, Cosmina. A Web based Publish-Subscribe framework for Mobile Computing. (IJACSA) International Journal of Advanced Computer Science and Applications, vol. 5, No. 4. 2014. (10 pgs).

Madden, Samuel, et al. Fjording the Stream: An Architecture for Queries Over Streaming Sensor Data. Proceedings of the 18th International Conference on Data Engineering, p. 555-566, Feb. 26, 2002. ieeeexplore.ieee.org. (12 pgs).

Roffia, Luca, et al. Dynamic Linked Data. A Sparql Event Processing Architecture. Future Internet 2018. 10, 36; doi:10.3390/fi10040036. www.mdpi.com/journal/futureinternet: (33 pgs).

* cited by examiner

METHOD FOR WIRELESS EVENT-DRIVEN EVERYTHING-TO-EVERYTHING (X2X) PAYLOAD DELIVERY

RELATED PATENT APPLICATIONS

This application is a continuation and claims priority under 35 USC § 120 of prior and now pending U.S. patent application Ser. No. 17/369,785 filed Jul. 7, 2021, which patent application is to be issued as U.S. Pat. No. 12,035,209 on Jul. 9, 2024. That application claimed priority under 35 USC. § 119 (e) from U.S. Provisional Patent Ser. No. 63/049,041 filed Jul. 7, 2020, entitled Method for Event-Driven Vehicle To Anything (V2X) Payload Delivery To Singular Or Distributed Systems, the disclosures of each of which are incorporated herein in their entirety, including the specification, drawing, and claims, by this reference.

STATEMENT OF GOVERNMENT INTEREST

None.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to networked communication systems, and more particularly to methods and apparatus which may be used to facilitate communication across wireless networks, such as cellular networks, of large data packages such as may be encountered in remote or autonomous vehicle operations, or in monitoring and control of various devices, whether stationary or mobile, that are connected to such networks.

BACKGROUND

The development of improved, highly efficient methods for handling of large file sizes and/or data streams has become increasingly important, since remote, robotic, or autonomous machines may generate data packets having significant size on a routine basis. As an example, it has been reported that Google self-driving cars generate seven hundred fifty (750) megabytes of data per second. While mass production autonomous vehicles for commercial use in the US may only generate five percent (5%) to ten percent (10%) as much data, the burden of processing of data payloads in the range of about forty (40) megabytes of data per second has remained a significant challenge to market growth, as well as to meet required assurances and safety requirements of regulators. Thus, a method for processing sizable data payloads over existing cellular networks, for example, would be desirable in a variety of "Internet of Things" ("IoT") applications, whether for stationary devices used in cities for monitoring and control of a variety of devices, or for robotic devices, or for autonomous vehicle applications. When considering the necessary safety issues in certain applications, facilitation of prompt communication of large data payloads becomes especially important.

In some applications, such as in self-driving vehicles that run autonomously, generation of anomalous information occurs regularly, but in general, such equipment presently lacks the ability to process most (if not all) of such data locally. Further, system administrators, as well as regulatory authorities of various governmental entities, require oversight of efficiency and/or safety aspects of such operations. Thus, they need a better way to timely receive and process such data. More generally, most if not all existing systems need better methods that would provide a way to automate the offload of data, and especially larger size data packages, nearly instantaneously or at very near the time when the data is generated. Such requirements may, for example, apply to reporting of a single vehicle event from a device to a home administrative computer system. Or, in other situations, an administrator may be faced with handling data generated by a large fleet of numerous vehicles—i.e. hundreds or thousands—or handling data from a city full of widely distributed sensors of various types.

Although some prior art concepts have attempted to improve communication between remote devices and servers the prior art systems known to me have failed to fully address the needs of communication with either stationary remote devices, or with moving remote devices such as vehicles. As an example, US Patent Application Publication No. US 2021/0064671 A1, published on Mar. 4, 2021, entitled Real Time Exchange of Update Information Over a Network Using WebSockets Coupled to a Message Queue, by Rishi RAMRAJ, describes use of a standard queue having a first-in-first-out technique, rather than a first-to-finish asynchronous message system as taught herein. The methods described by the Ramraj publication provide a linear message flow, from a server to a remote device, and not the reverse, i.e. data packages from a remote device to a server, as provided by the invention(s) described herein. And, his methods do not accommodate or provide for different handing of different types of messages, for example, use of differing techniques for handling commands as compared to data payloads. And, unlike the invention(s) described herein, his methods do not provide for the use of workers, i.e. a server provided by a group of server units, to handle, for example, parallel feeds of incoming data payloads without use of a sequential queue. In the Ramraj method, data is uploaded and remains in a queue, whereas in the invention(s) disclosed herein, portions of data may be dropped in favor of new data (because it is faster) unless the message is actually a command. Finally, to enhance communication speed of large size data payloads, the invention(s) disclosed herein does not solely use WebSockets, but rather uses a combination of WebSockets (for streaming data) and webhooks (for transmission of files or commands), by the manufacture of file chunks at a remote device, and the reconfiguration of the file chunks to time ordered files at a server. Fundamentally, the methods taught by Ramraj are primarily for communication of administrative type data from a server to remote devices, and is not directed to, nor optimized for, the communication of triggering event data from one or more sensors at a remote device back to a server. Thus, the methods taught herein are a significant improvement in the art over the methods described by the above noted Ramraj publication.

Consequently, there still remains an as yet unmet need for a method for facilitating the transfer of large data packages across networks, and in particular, across cellular networks, in a stable, predictable, and highly efficient manner under then existing environmental and bandwidth constrained conditions. In order to meet such need and achieve and provide a method for the transfer of large data payloads, it has become necessary to address the basic technical challenges by adopting a combination of methods for such activities. Thus, it would be advantageous to provide for efficient transfer of large data payloads using a reliable and suitably configured data transfer protocol, and which is efficient and sufficiently timely in normal operations.

SUMMARY

In order to significantly improve data transfer rates between stationary or moving remote devices and a server connected with such stationary or moving devices, a computer-based system has been developed to facilitate such rapid data transfer rates. In an embodiment, a remote device (e.g. Internet of Things device having sensors, or a vehicle or robot having sensors) is provided with a sensor data ingestion device having instructions therein which, when executed, receive and process data to place it in a form suitable for rapid download by a remote server. The sensor data ingestion device may include a memory buffer having a computer-readable memory, and a queue unit including computational circuitry configured to generate a queue status associated with triggering event data which is stored in the memory buffer. In an embodiment, the triggering event data is stored in a virtual queue in the memory buffer. In an embodiment, instructions in the sensor data ingestion device may provide for a queue modification procedure, or the server may present a queue modification menu including one or more instances of a priority level choice. In an embodiment, the sensor data ingestion device may further include a queue controller including computational circuitry configured to modify objects in a virtual queue of triggering event data from sensors located at a plurality of devices, and which are associated with a plurality of messages. The queue controller may be responsive to receiving one or more inputs indicative of a user priority level choice amongst the plurality of messages. In an embodiment, a server may be configured to broadcast a notice of readiness to download triggering event data from the virtual queue. In an embodiment, the server includes computational circuitry having a persistent WebSocket communication pathway configured to request of the download of triggering event data files via the WebSocket. When using the WebSocket, the computational circuitry at the sensor data ingestion device provides data packets each comprising a portion of an original triggering event data. The data packets downloaded by the server are then reconstituted into a duplicate of the original triggering event data.

In an embodiment, the computational circuitry in the queue controller is additionally configured to create triggering event data file packets comprising file chunks from triggering event data. In such case, the file chunks comprise a plurality of time layered files, where each one of the plurality of time layered files comprises a portion of a triggering event data file package. The file chunks are placed in a virtual queue in the memory buffer. In response to an inquiry from the sensor data ingestion device, the server is configured to broadcast a notice of readiness to download file chunks from the virtual queue. The server includes computational circuitry having a webhook configured to request the download the plurality of time layered files via the webhook. The plurality of time layered files downloaded by the server are reconstituted into a duplicate of original triggering event data file packets. In various embodiments, the time layered files may include a plurality of files having LiDAR point cloud data or video data readable topics therein.

In various embodiments, the computer-based system provides data in the form wherein the server downloads triggering event data as streaming data. In an embodiment, the system may further include a visual viewer, wherein the visual viewer is configured to render the streaming data. In an embodiment, the system may further include a machine learning algorithm, in such case, the streaming data may be processed by the machine learning algorithm. In an embodiment, the sensor ingestion device may be on-board an autonomous vehicle.

In an embodiment, the system may have a queue controller that is further configured to interrogate each triggering event data package to determine whether or not the triggering event data package indicates occurrence of a new event. In various embodiments, the server may download triggering event data as a plurality of .bag files organized by time, and in such case, each .bag file would be a portion of an original triggering event data file package. More generally, in an embodiment, for each new event, the plurality of time layered .bag files may be provided in the form of a plurality of .bag files having LiDAR point cloud or video readable topics on the triggering event, and such files would be captured by a node file handler and downloaded by the server. In various embodiments, a server may be provided in the form of a group of workers, where the workers, taken together, provide a server, and wherein the group of workers are configured to receive, in parallel, separate data streams from the sensor data ingestion device.

BRIEF DESCRIPTION OF THE DRAWING

The invention(s) set forth herein will be described by way of exemplary embodiments, illustrated in the accompanying drawing in which like reference numerals denote like elements, and in which:

FIG. 4 is a diagrammatic representation of the processing of captured feeds of data, such as sensor data, to create a time-series of files with data-type specific message topics, which may be provided by creating a plurality of specific types of files, which are then organized and offset by time, to create a buffer containing the data from sensors of other data providers sent from a device, vehicle, robot, or the like.

As described above, the various drawing figures provide flowcharts and diagrams of data flow for processes and systems useful in event-driven data payload delivery applications, as may be especially useful in Internet of Things (IoT) and autonomous or semi-autonomous vehicle applications. Thus, the foregoing figures, being merely exemplary, contain various elements that may be present or omitted from actual systems, methods, and apparatus that may be utilized and/or constructed to practice the methods and systems taught herein. An attempt has been made to draw the figures in a way that illustrates at least those elements that are significant for an understanding of the various methods taught herein for the design, construction, and operation of high efficiency event-driven data payload delivery applications. However, various additional elements may be added and employed, and utilized in connection with the practice of the invention(s) disclosed herein.

DETAILED DESCRIPTION

Figure 1:
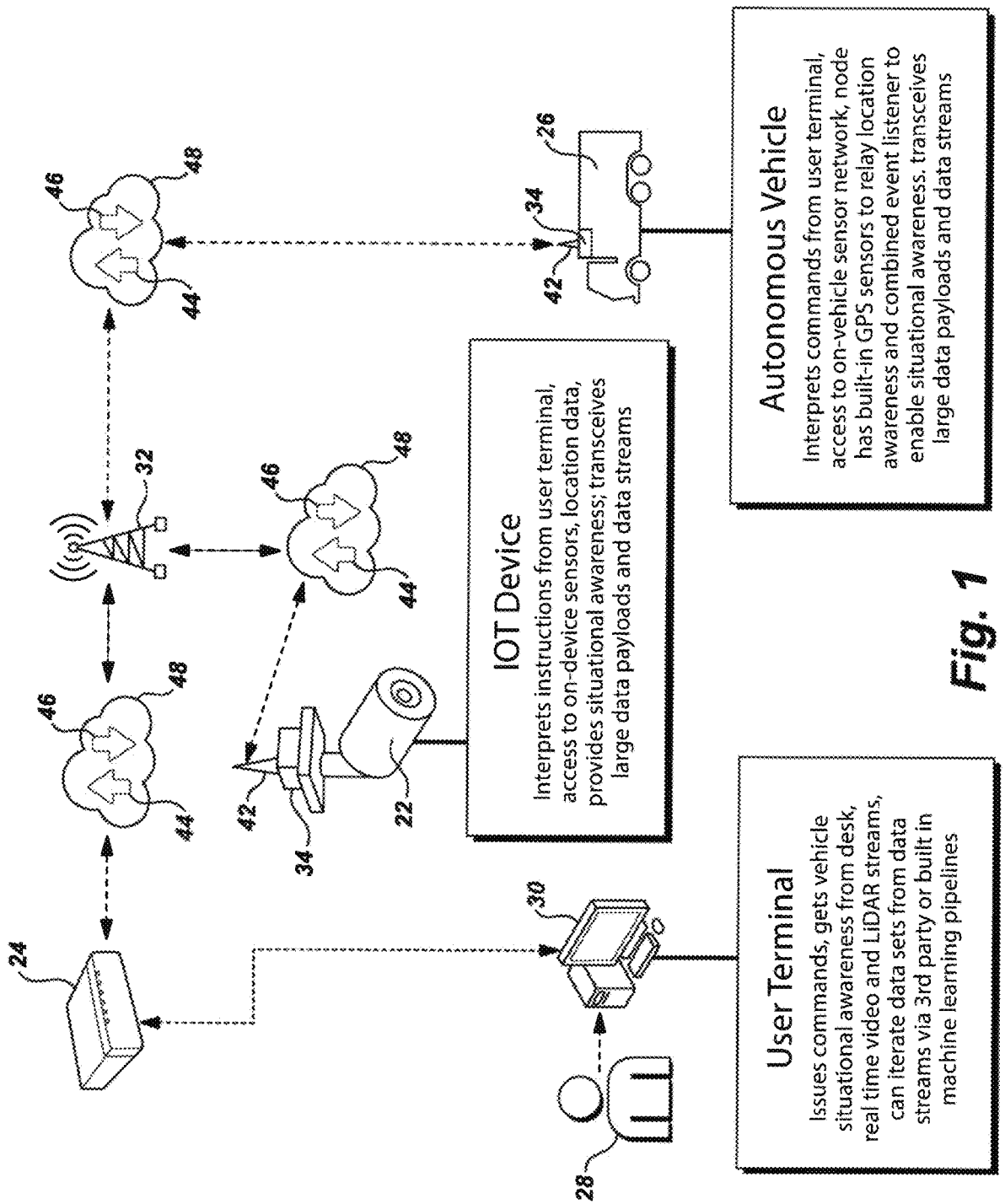
FIG. 1 provides a pictorial representation of download and upload of data during communication between a user terminal computer and an autonomous vehicle or remote device via a wireless network such as a cellular network.

Attention is directed to FIG. 1, where an overview for an exemplary method and system 20 for large data payload transfer from "Everything-to-Everything" (X2X) in various data generating systems is depicted. For purposes of this specification, unless expressly set forth otherwise, or unless another interpretation is required by the specific context mentioned, the various X2X applications as discussed and described in detail herein should be considered to include Network-to-Infrastructure (N2I), Vehicle-to-Everything (V2X), Vehicle-to-Vehicle (V2V), Vehicle-to-Infrastructure (V2I), Vehicle-to-Network (V2N), Vehicle-to-Rover (V2R) and even Rover-to-Network (R2N), where for example, the Rover may be a robotic device, or a pedestrian (e.g. soldier) equipped with suitable communication equipment that provides the functionality of the systems described herein. The technology presented herein is generally directed to communication between two or more devices, i.e. device to device communication ("D2D"), or between a device 22 and a server 24 (i.e. "D2X") that is capable of downloading data from a stationary device 22, or mobile device 26 and to associated systems and methods. Data gathering and transmittal may be useful in communicating with equipment used in farming, or in sensors located in cities, or with autonomous vehicles (automobiles, or submersibles, or the like) or roving persons or devices, such as various types of robotic devices.

Figure 7:
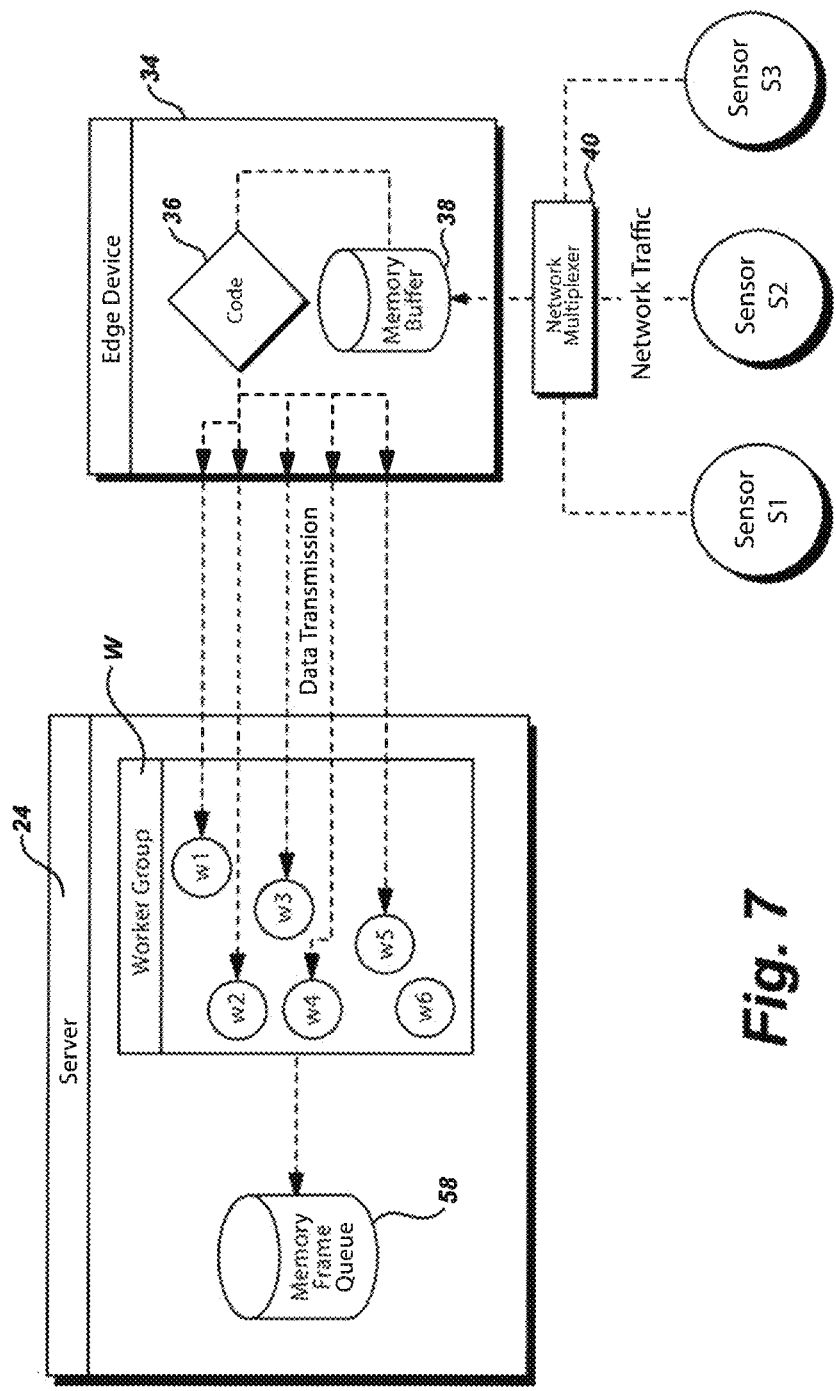
FIG. 7 provides a diagrammatic view of the flow of data from sensors on a stationary or moving device, to an on-board edge computing device where the data is briefly stored, and processed into data packages for transmission, for example by a cellular network, and then showing how such packages are received at a server, where they are recombined into proper time sequence data streams or files.
Figure 8:
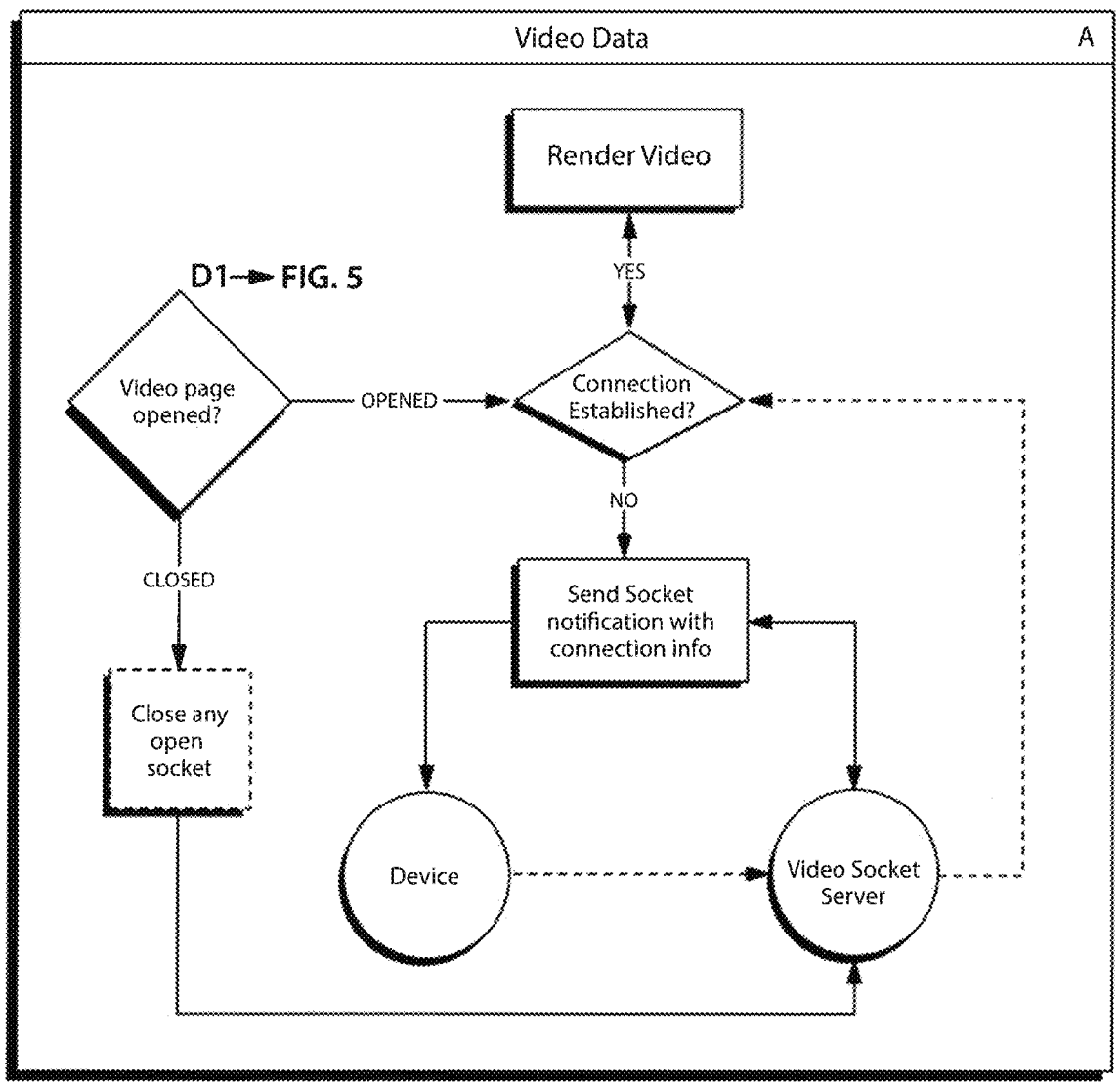
FIG. 8 provides a diagrammatic representation of the flow of video data that may be obtained at a device and transmitted via a video socket server to provide for video review.
Figure 9:
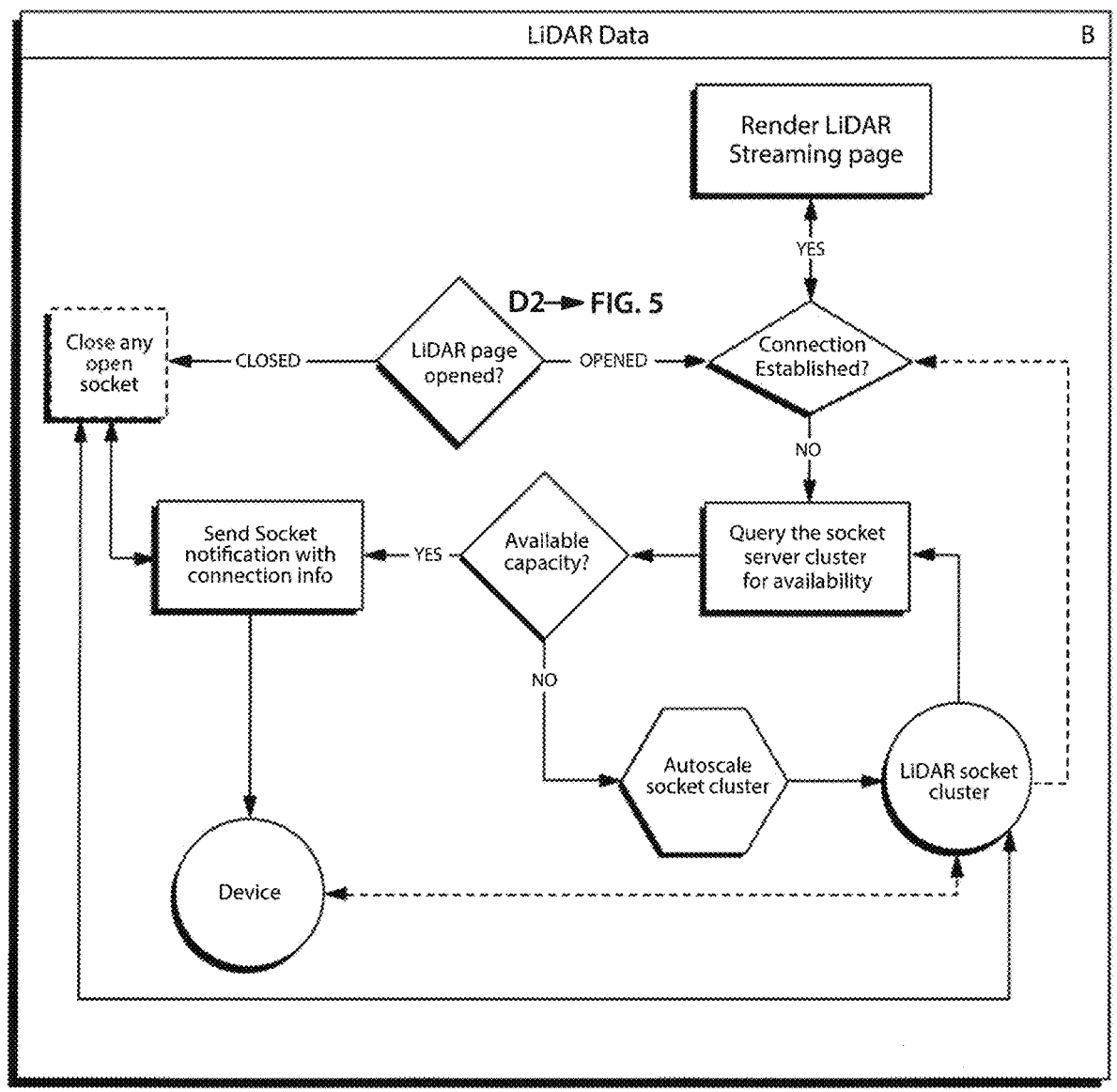
FIG. 9 provides a diagrammatic representation of the flow of LiDAR point cloud data that may be obtained at a device and transmitted via a LIDAR socket server or LiDAR socket cluster, to provide for LiDAR data review.
Figure 10:
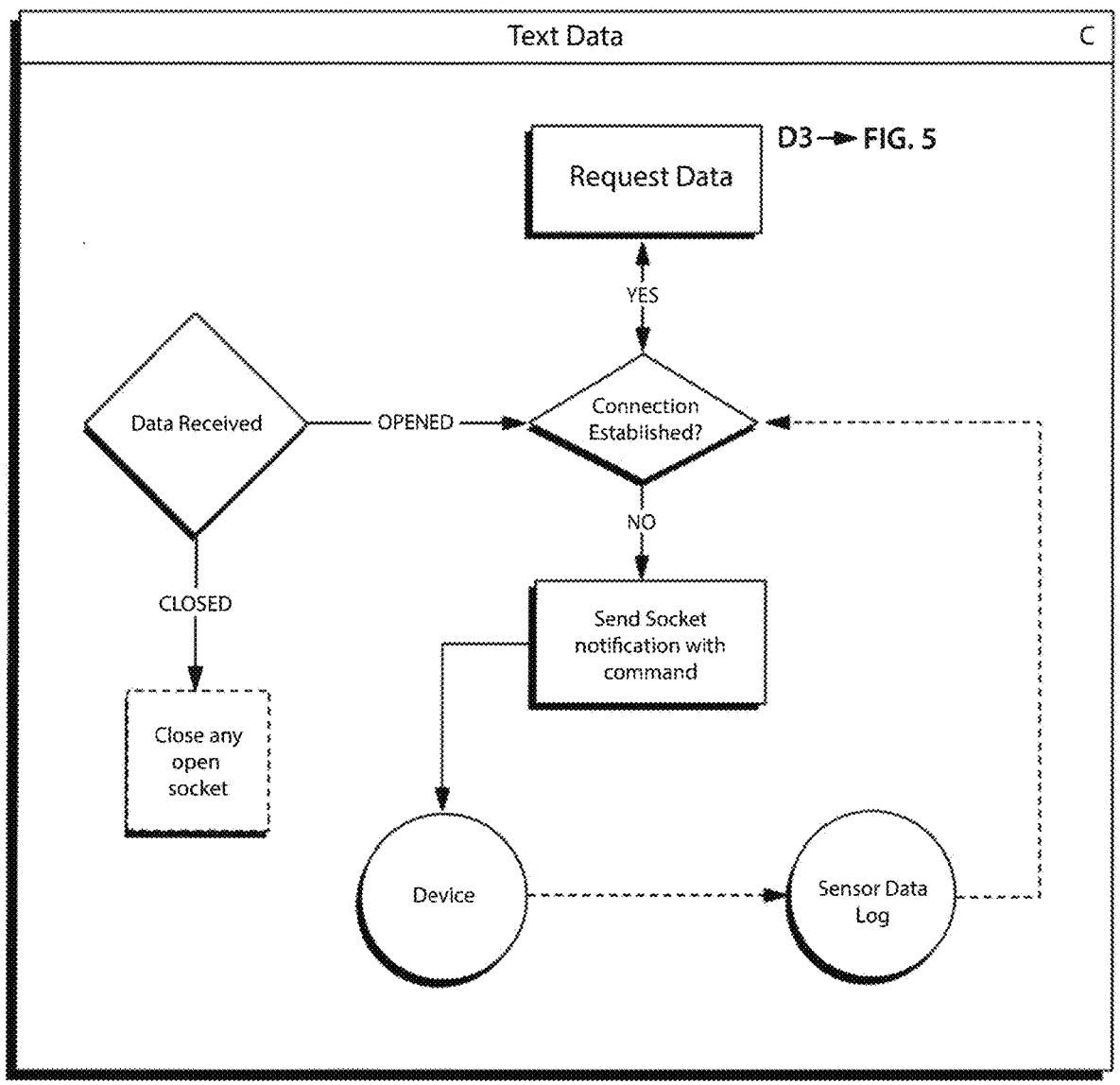
FIG. 10 provides a diagrammatic representation of the flow of text data that may be obtained at a device and transmitted via a WebSocket connection, to provide review of text data.
Figure 11:
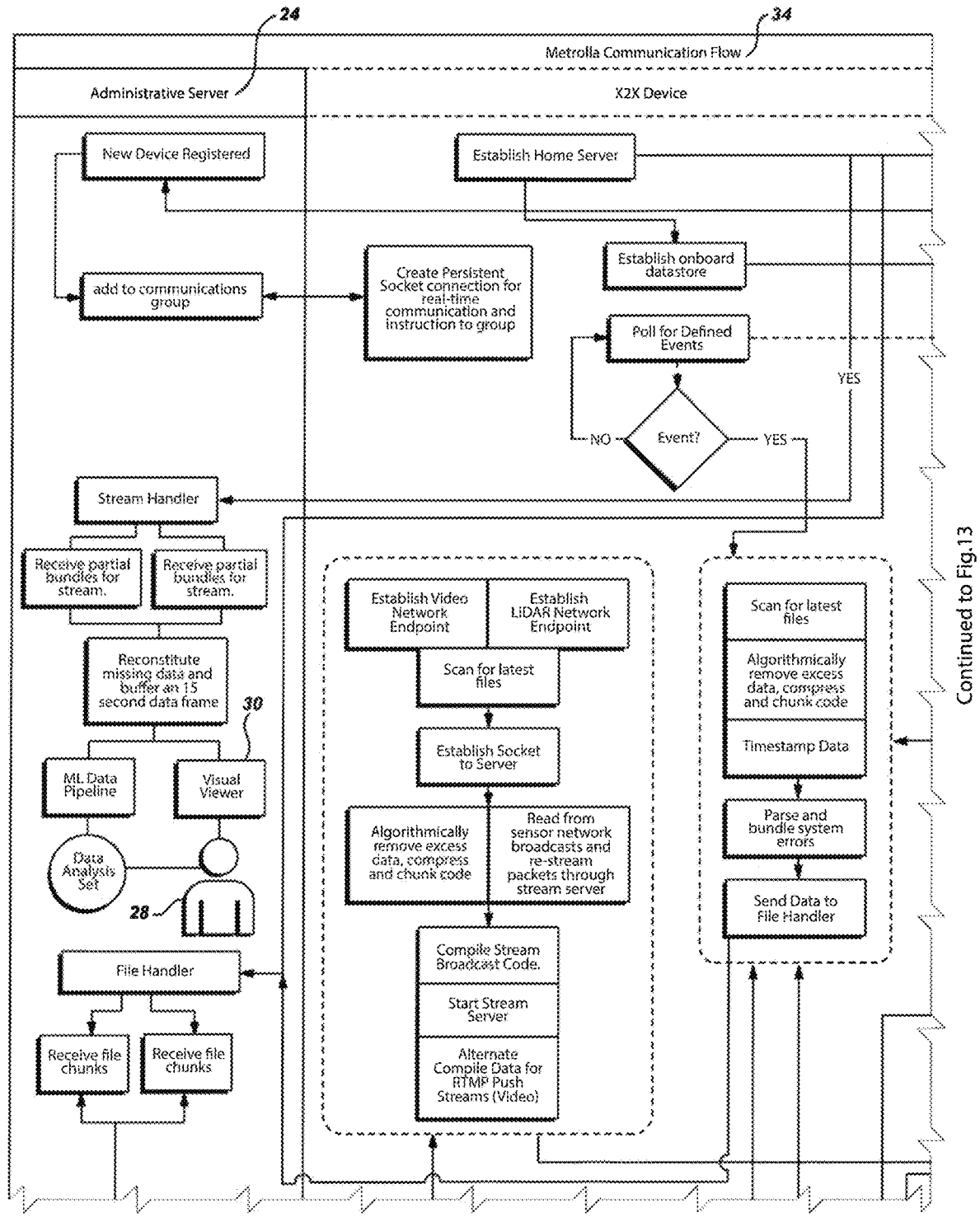
FIGS. 11, 12, and 13 are, taken together, a system diagram, depicting the various components of communication flow when using the Metrolla™ Autocomm Communication System as a sensor data ingestion device for delivery of data packages, using an event-driven flow paradigm method as described herein, generally showing those functions performed locally at an edge computing device, e.g. at a remote data gathering site or in an autonomous or semi-autonomous vehicle, the communication links established via WebSocket communication channels, and the activities which may be conducted at a home base server or administrative server which receives the data packages; note that the items shown to occur at a vehicle apply equally in case of a stationary remote device, such as a camera or other device with sensors.
Figure 12:
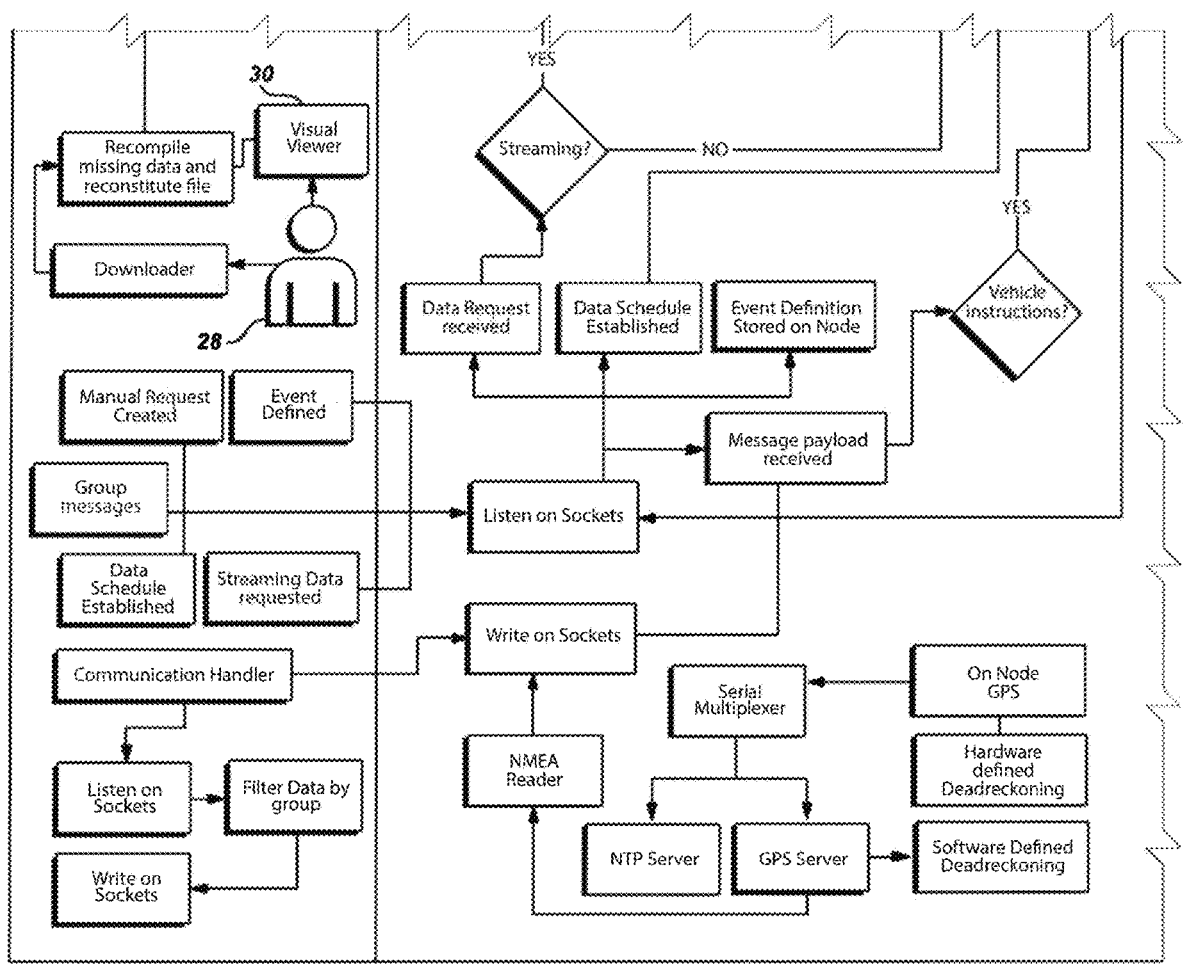
Figure 13:
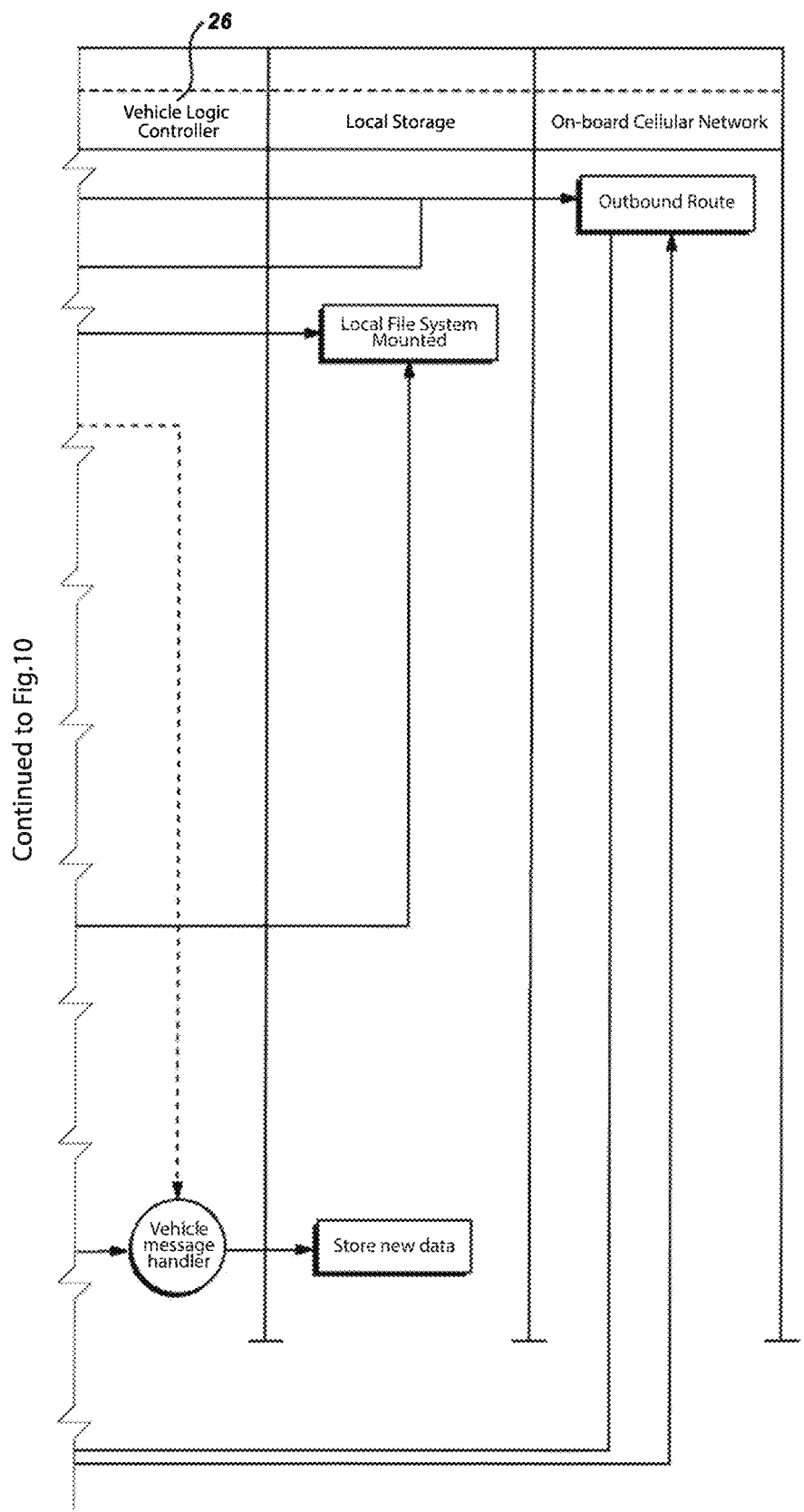

In general, the embodiments described herein provide novel event-driven payload delivery techniques for various applications. The embodiments automate the request and delivery of data to and from stationary 22 or moving 26 and servers 24 that administrators may use to observe or control the moving 26 or stationary 22 devices, such as by user 28 interfacing with terminal 30. The system 20 taught herein may be especially useful for communication via cellular networks 32. The techniques described herein allow administrators to pipeline data directly from moving 26 or stationary 22 devices to their technicians 28 or to software such as maintenance or machine learning (ML or AI) software within server 24 that may provide for continuous or intermittent iteration of changes or updates to the moving 26 or stationary 22 devices and their associated computing systems. In various embodiments, the moving 26 or stationary 22 devices may be equipped with a sensor data ingestion device 34 that may receive data from a plurality of sensors, e.g. sensors S1, S2, and S3 as seen in FIG. 7, further discussed below. As also shown in FIG. 7, the sensor data ingestion device 34 may be considered an edge computing device that performs various computations on incoming data from sensors S1, S2, S3, etc., and then performs certain operations by on the data via coded instructions 36 while preserving at least some of the data in a memory buffer 38, before processing such data and making it available for download by the server 24. In an embodiment, the sensor data ingestion device 34 may include a multiplexer 40 on the local network, to enable timely processing of portions of incoming data from each of the sensors S1, S2, S3, etc. in a group of sensors in a series from S1 through SN, where N is a positive integer. As seen in FIG. 1, in various embodiments, the sensor data ingestion device 34 may include an antenna 42 and internal modem (not shown) for wireless broadband communication to the server 24. Communication between the stationary 22 and moving 26 devices and the server 24 are bi-directional as indicated by upload 44 and download 46 arrows in communication clouds 48. However, as indicated in FIG. 2, communications are not limited to cellular 32 networks, and may also be conducted by other available networks, such as WiFi 49 networks, or ethernet 50 networks, or other wireless communication networks as appropriate, each with a suitable network controller 51.

Figure 2:
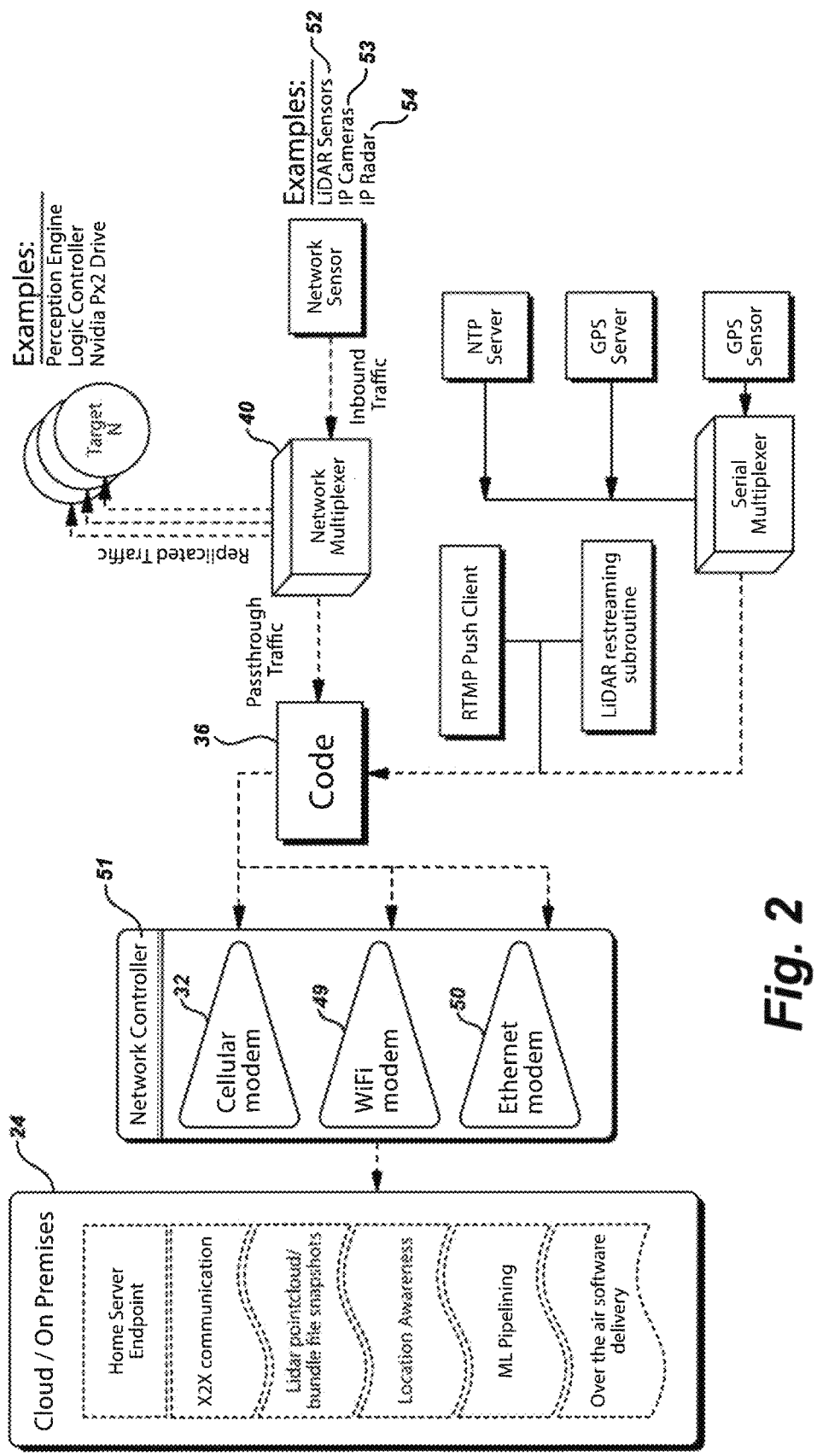
FIG. 2 provides a diagrammatic representation of the use of a home server for communication with remote devices via a network, where, in various embodiments, output data from networked sensors such as LiDAR sensors, cameras, radar, or other sensors may be processed via a network multiplexer and forwarded to an edge computing device, as well as passed through code processing step to prepare the data for transmission via a network having a network controller, to a server, located on on-premises or provided via cloud computing connection, for further use.
Figure 3:
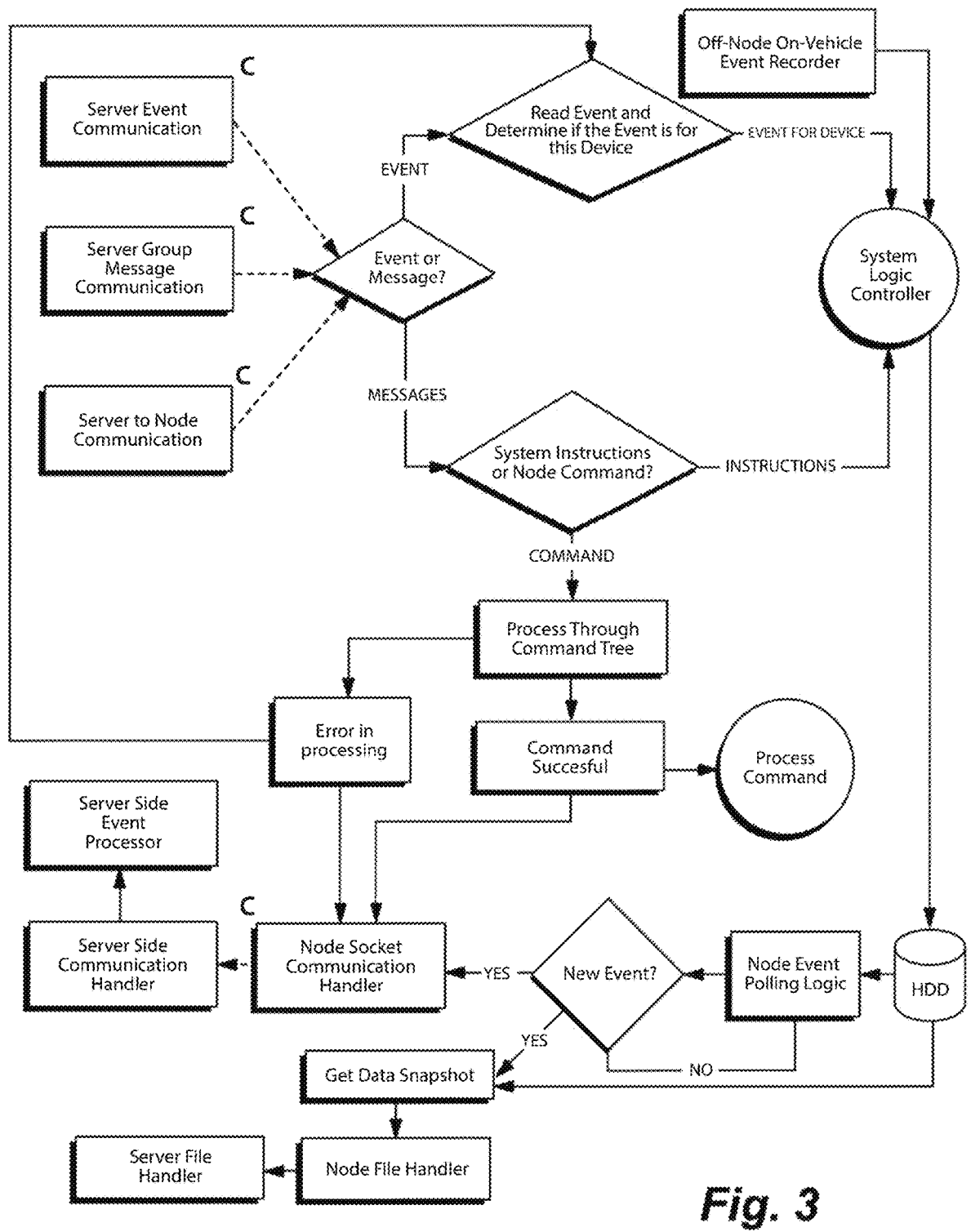
FIG. 3 is a diagrammatic representation of the processing of event data, and the processing of event data through a command tree, and showing how on-board event data may be recorded, interrogated, transmitted to a home server.

As seen in FIG. 2, LiDAR sensors 52 may provide point cloud data generated by one or more pieces of moving equipment (e.g. a fleet of taxis or delivery trucks or freight haulers), and the techniques described herein provide for the processing of LiDAR point cloud data, illustrate how on-board generated LIDAR point cloud data may be recorded, interrogated, and transmitted via streaming, or in file chunks, to a home server 24. Such data payloads, more generally, may be generated via a variety of sensors, such as cameras 53, or IP radar 54, or a variety of environmental or vehicle sensors, and such sensor data can be used to create a series of time-stamped file portions having type specific message topics, which may be provided by creating a plurality of specific types of files, which are then organized and offset by time, to create files in a memory buffer containing the data from sensors of other data providers sent from a device, vehicle, robot, or the like. The buffered data may be sent, especially on occurrence of triggering event data or flagged event data payloads, and downloaded by a server 24 that may be monitored by users 28, e.g. by system administrators.

In an embodiment, a server 24 may deliver a software instruction or patch to the remote devices 22 or 26, with a communication that allows a user 28 to direct the device 22 or vehicle 26 to take an action if and as required. The system 20 described herein may provide continuous near-real time streaming of video and LiDAR point cloud data to the server 24 thus offloading such data beyond the vehicle 26, if and as required. On the other hand, often there may be no need for upload of any data to the server 24, if no triggering event has occurred.

In an embodiment, moving 26 or stationary 22 remote devices may be connected to a server 24 through a network. In an embodiment, the network may be a cellular network 32. The methods described herein may be operated at an administrator's computer terminal 30 at the server 4 end, or, in an embodiment, at the remote moving 26 or stationary 22 device.

In a general operation, when using an onboard preinstalled configuration file, a moving 26 or stationary 22 remote device may establish a node that can automatically provide a connection over a pre-existing network and deliver its communication and data payload to a home server 24. The home server 24 may be configured as a decentralized cloud server, or as an on premise server, or may be provided using a Software as a Service (Saas) Solution. As seen in FIG. 7, in an embodiment, a plurality of workers may be provided as a worker group, including workers W1, W2, etc. in a series of workers through WN, where N is a positive integer, and such workers form, in combination, a server 24. Use of TCP socket connectivity allows for the server 24 to take in streaming communications from a plurality of nodes, and establishes the real time direct communication between nodes and other nodes, and between nodes and a server 24 and other servers.

In an embodiment, WebSocket communication establishes the command delivery method to each device. The node uses existing information about the server 24 to direct the server 24 to download a data payload to the server 24, upon request from either the server 24 or from the sensor data ingestion device 34, using edge computing logic at the moving 26 or stationary 22 remote device. In this manner, a socket connection is established. The handshake between the server and node is pre-existing and thus allows for immediate action should a data payload need to be acted upon or revalidated. Or, in response, a new set of information may be deployed from the server 24 to the connected stationary 22 or moving 26 devices, such as a vehicle or a fleet of vehicles.

By establishing the socket connection, the automation receives and sends data that looks at conditions of an event and requests by user 28. The logic flow receives information with a set of commands, these commands look to establish the breadth and depth of the payload. If the payload is meant for the node in question, the node then scans for the data requested and determines if the data is valid. The data types may be sorted, in some cases file type variations can exist and the logic may sort out what kind of file it needs to provide or replay (for example, a .pcap file vs .bag file, or more generally, a specific .file name). After the data is validated it then has to establish its authentication by implementing Application Programming Interface (API) keys. The server 24 is then is set to retrieve the data and validate the data on arrival and determine what device it came from, tag it with metadata and timestamp it accordingly.

In an embodiment, the method and system described herein may be used for streaming LiDAR over LTE/Cellular based networks 32 between ad-hoc devices (e.g. devices 22 and 26) and servers 24. As an example, administrators and governments may require access to data on autonomous vehicles in order to process data for continuous oversight and monitor for any actual or potential liabilities. The method and system 20 described herein for a method of streaming LiDAR point cloud data allows for a constant stream of data to engineers to create new predictive models and iterate over existing algorithms. Additionally, the method and system allows for devices such as remote vehicles to have uninterrupted service while data payloads containing required information is extracted. Thus, by use of the method and systems described herein, improved regulatory oversight, and improved use of Machine Learning ("ML") data pipelines, can both be achieved.

In an embodiment of the methods and systems provided, LiDAR data may be sent to a server for viewing or manipulating by an administrator or machine. Basically, LiDAR generated point cloud data is effectively a text based series of three dimensional coordinates with supplemental metadata. By breaking apart the data and removing some of the coordinate points in the LiDAR point cloud, a smaller data set may be created. Then, the smaller data set can be divided and layered in a time-offset queue to create a memory buffer for multiple files, from which files can be read back without the user needing to do anything but view and interact with the LiDAR point cloud as rendered.

A sensor data ingestion device 34 at a mobile 26 or stationary 22 remote device (such as a vehicle, or a stationary sensor, or a robot), reads data on the local network and stores data in a computer readable memory buffer 38. On the other end of the network is a server 24 or cluster of servers W ("worker group") where the data is downloaded and configured for storage in a computer-readable memory queue 58. At a remote device, there may be various types of storage devices (e.g. a solid state hard drive) where the data is stored, as well as an on-device network where data from one or more sensors can be listened to as it is broadcast by the sensors to the remote device. When a stationary or mobile device is activated, a call home to a server may be completed, which allows administrators to communicate with the device, to download data packages, download streaming data, or download files, as well as to send commands. When a command is received to stream data for downloading by the server, the remote device then starts a process of listening for incoming LiDAR data on the local sensors to the remote device which includes an edge computer on-device network, to find the most recent data stored in the memory buffer of the on-device storage drive. The data is then processed by the local edge computer on the device, where the data may be altered by processing the data into smaller data packages, for lower network overhead, and then reconfigured into a time-series set of smaller files. The device may then establish a connection for transfer of such data packages, over a VPN or reverse tunnel or other available channel with available bandwidth, depending on network conditions and requirements. After the server downloads the files, the files are then sent (in an embodiment, in parallel), through a reverse algorithm that reconfigures the streaming data or data files, and backfills any missing data. Then, the streaming data or data files are stacked in time-series in a buffer on the server to provide for playback or display of the reconfigured data stream, or files. As more files come into the server, they get stacked in the same way to create a long lived ephemeral file in a memory buffer, which can be read, rendered, and/or saved.

In an embodiment, the techniques described herein may be used in a method of automating on-vehicle event communication over V2X LTE/Cellular based networks, between a selected device and server located remotely from the device. As with all machine learning and iterative computation processes, new things are learned both in the field—at a mobile or stationary device—and outside of the field—at other devices on a network, or elsewhere. It is an advantage of the communication techniques taught herein that new findings from sensors on a device, and new findings from sensors or processes not on a device, may be utilized in a machine learning environment in order to expand the capability of the on-device edge computing processes, thus expand capabilities of the device, which may, for example, improve capabilities as required for full autonomy of self-driving vehicles. And, such additional findings may be useful, in an embodiment, if further establishing criteria for identification and reporting of an event which merits promptly providing data packages to a home server, for distribution to remote stationary 22 or moving 26 devices.

The reliable and timely communication to a home server 24 of required reports for autonomous or semi-autonomous vehicles may be very important for manufacturers of cars, trucks, farm equipment, mining equipment, or other equipment. Notably, in many applications, retention of all data generated by various sensors during the course of normal operations or monitoring is not required. Thus, certain defined events may be established that have a much higher importance as regards data analysis, response, review, and retention. Importantly, using "on-board" edge computing capability for nearly instant analysis and notice to a home server 24 of availability of data for further review and response (often simultaneous to or subsequent to any initial action taken in response to on-board programed instructions in the edge computing device), is helpful. The techniques described herein further allow lowering of bandwidth requirements when using cellular networks 32, by selecting for immediate transmission of key data that is associated with a defined event that has been triggered by on-board sensors at the device.

Accordingly, in an embodiment, the method and systems taught herein provide the framework which enable the establishment of definitions of events that will remotely and automatically notify administrators at home servers, while supplying an automated bundle of data for engineers or other personnel to determine why the event notice was triggered. Thus, in an embodiment, upon occurrence of a triggering event, a data package may be prepared for download by the server. When devices or equipment are equipped with a cellular modem, and the triggering event is notified by communication over TCP socket channels, then the outbound initiation of availability of data packages from the on-vehicle device initiates, at the home server, the process of download of data packages.

In various embodiments, the on-board software at a device may include command software which evaluates data from sensors to determine when an alarm or triggering event occurs. In various configurations, an alarm or triggering event may be an actionable item identified by the listener on edge computing components such as a vehicle logic controller, or on a node associated with an IoT device. Events can be defined by a user or predefined by the on-board vehicle software or on-board device software, and thus may be pre-existing on a vehicle or device. In an embodiment, events can be defined at a server on the network, and then sent from an off-the-vehicle (or device) to the node for definition and/or action. When a Server V2X Event occurs, it can be sent to a single device or a group of devices. Conversely a single device can also send events to a group of devices or to only a selected set of devices. And, as noted above, events can be defined by users who communicate them to a node on a device, via a server.

In various embodiments, event communications may be provided in a bi-directional manner. In such embodiments, a Server Group Message Communication, as well as a Server to Node Communication (X2V) may be two-way. Likewise, a Node to Server Group Communication (V2X) may be two-way. As noted above, for purposes of description of this example, "vehicle" may be substituted by any stationary or mobile remote device, whether a sensor, a device, a robotic device, or a person equipped with communication equipment as set forth herein. In any of such embodiments, the software at the node determines the kind/type of message or data payload which is delivered. If a message is delivered to the stationary or mobile remote device, and the edge computing software determines that the message is for the device itself, the message may be processed to determine if the message triggers an event. In such an instance, the edge computing software may further determine if the event is actionable. The node may then also determine if a new or updated definition for an event needs to be created (e.g., a new event has occurred) and if any actions need to be processed. If an action is required, the logic tree for the action is carried out. The definition gets passed to the local storage at the node, where such information is stored, so that future similar or identical events may be processed automatically. Regardless of whether or not any local commands that have been generated are successful, a message is generated and sent back to the administrative server, to provide notification of the event command status. On occurrence of a successful event process, regardless of whether an actionable command was generated, a bundle of data gets created at the edge computing device on the stationary or mobile device, from data stored on-board. The data is prepared into data packages, and the device notifies the administrative server that the device has data available for download by the administrative server. The files are obtained by the administrative server in an efficient data package handling process, further described below.

In various embodiments, a method and system is provided for downloading and receiving data payloads, as well as for upload of data payloads, to or from such a device (or vehicle) over cellular based V2X-LTE Networks. Such networks may be provided between a selected device and remote administrative server.

Administrators may need to retrieve data from a device or vehicle. Administrators may also need to provide for data payloads to be distributed to devices or vehicles. The method and system developed and taught herein provides for a method and system which allows a node and accompanying administrative servers to efficiently download data in a scalable and efficient fashion. Likewise, for data payloads which are necessary to provide from the administrative server to a device or vehicle, the same components may be used by reversing the process, or by having the administrative server upload data packages for distribution. In an embodiment, the data payloads may be configured in the form of json objects (JavaScript object notation objects). In an embodiment, the data payloads may be configured as large software bundles. Consequently, a multifaceted solution to the communication service is provided by allowing the data payloads to traverse in the same way.

In an embodiment, a suitable method and system can be established by sending and receiving data between devices using a socket based chat application. The socket based application may deliver json payloads, which can be configured into various data types. In one exemplary application, the process allows for the offloading—e.g. downloading by an administrative server—of very large files (greater than 1 GB) from an IoT Node on a moving vehicle to a remote data storage facility off of the vehicle. Such a data transfer may follow an occurrence of a triggering event as described above. Such data transfer may also follow a request by a user of the administrative server, by selecting a data stream for rendering and viewing, or by selection of a series of files which may provide data generated at or near the time an event is triggered.

In an embodiment, there may be two ways to trigger the download of data from a remote device (node) in this case. The device can listen for an event or receive a command from the server. When this occurs the node reaches out for the latest files on the on-vehicle. If it cannot find the latest file, or other recent file, within a defined recent time frame of (e.g. 10 minutes) the device will listen for the LiDAR and video broadcasts on the network. It then captures the feeds and creates a number of sequential .bag files as defined by the Robot Operating System (ROS) that are sliced in convenient, small time frame intervals (such as 10 to 30 second intervals) as may be defined by administrators. See https://www.ros.org/for reference sources regarding file handling using the ROS file system. Such files are then sent in parallel to the server and recompiled into larger files (e.g., 2 to 3 minute long ROS .bag files, or files with similar characteristics using other file name protocols). As an example, the information stored in the bag files may include video data, LiDAR data, inertial measurement unit (IMU) data, GPS coordinate data, and data from other sensors, and metadata.

In an embodiment, if a file can be found on the network hard drives that match the specifications, it follows a similar approach to the above where the file is played back in sequential intervals and a .bag file is then transcribed into time-series ROS .bag files of much smaller size as described above.

In various embodiments, data may be removed algorithmically to reduce overhead on the cellular networks that the files traverse via a reverse proxy or VPN, which is established on demand to allow for the files to be securely and reliably sent to a server. The data is then run through a reversal algorithm that inputs the missing data back where it came from and the files are reconstituted into a larger, more complete file for the administrators to work with.

In an embodiment, when an administrative user sends a request to a device for a data payload, the user may send a command which opens up a reverse tunnel or VPN to the node. The node then sends a message over the device specific TCP socket communication to the home server at an address where the home server can download the incoming files safely. On receiving the requested files, the administrative server determines what kind of file has been received, and then may perform further operations on the data package according to the file type and internal content. This allows for the device to receive over the air updates and data payloads for redeployment to other onboard systems by relaying the information (e.g., an update for an on-vehicle logic controller).

In an embodiment, autonomous vehicles may be monitored or controlled using selected on-board devices, behind existing LTE/Cellular gateways. Since administrators need a way to deliver instructions to vehicles (e.g. they need to request a vehicle return to base, or provide instructions for optimization of a delivery route), X2V communication makes such communication possible.

Various aspects of the method and systems for communication as disclosed herein may be used by many applications. Examples include allowing administrators to send instructions to vehicles to command the vehicle to perform an action, such as may be determined by the operator or manufacturer of the vehicle. Additionally, logistics information can be sent to a vehicle to negotiate a route, whether to a destination, or with respect to other vehicles in the same administrative group. Additionally, the data communications technique described herein can provide functionality for things like Inventory updates and vehicle inventory restocking.

In general, a method and system for self-driving vehicles to receive new instructional information from administrative users or automated instructional systems and pass that information on to on-vehicle network logic controllers is disclosed. The method and system may utilize a TCP socket communication service on a node to establish an inbound listener to send data in the form of lightweight messages such as json encoded text and numbers. The method employed may act much like a classic internet relay chat in that the users are internet connected edge devices. Communication and commands may be sent over a cellular network to the end device without having to establish a VPN or needing to know the IP address of the on-vehicle device. The administrative server may use a user terminal or secure socket endpoint to construct and send commands which allows receipt of status updates from a stationary or mobile remote device, such as an autonomous vehicle. The process allows for users to command a vehicle or groups of vehicles to provide command actions, as well as provide for accomplishment of other tasks such as visualizing location details, or obtaining vehicle situational awareness. The latter function may be accomplished by selecting a device or vehicle registered to the administrative server, and then viewing the parsed information displayed on the device information screen or on a device group informational screen.

In various embodiments, when streaming data is obtained by a server from one or more remote devices, WebSockets may be used to provide a persistent, low latency, real-time connection that may be used for rapid download of large quantities of data, such as up to about forty (40) megabytes per second. In various embodiments, data rates in excess of forty (40) megabytes per second may be achieved. WebSockets are an available computer communications protocol which can provide full-duplex communication channels over a single TCP connection. A WebSocket protocol was standardized by the Internet Engineering Task Force (IETF) in 2011 in a request for comment format as RFC 6455, and has been further developed as an API by the World Wide Web Consortium (W3C). Use of WebSockets basically involves an initial WebSocket handshake, using an HTTP protocol, which requests establishment of a WebSocket connection. Once the WebSocket connection is established, it provides for bi-directional communication between a client (here, a remote device) and a server. Thus, to create a persistent connection, one end of a WebSocket is provided at the server, and the other end of the WebSocket is provided at the remote device. After establishment of the WebSocket, the server 24 may download data from the remote device at any time, as well as send instructions to the remote device 22 or 26 at any time. The WebSocket connection is kept open—i.e. is persistent—and thus enables such communication on an on-going basis.

In order to reconstruct data from a stationary 22 or moving 26 device as it reaches the server 24, data payloads may include, or contain headers, or other metadata, with identifying information, such as dates and times, sensor particulars, location, and the like. This enables data streams to be reconstructed when it reaches the server, since at least some data packages may be prefixed with data about the payload. Similarly, such metadata may be included in instructions sets sent to the remote device. With distinct metadata provided on data packages, multiplexing may be utilized to split yet stream data packages from multiple sources (e.g. multiple sensors). In this way, a single WebSocket may be utilized for download by the server of data payloads from multiple sensors. Alternately, or additionally, multiple WebSocket connections may be established between a plurality of remote devices and a server 24, and in such instance, the server 24 is connected via a WebSocket to a local network on the various remote devices, and the remote devices include a computer-readable memory, from which the server 24 may download data payloads or data packets. In an embodiment using metadata, instructions either loaded on the remote device 22 or 26, or as may be provided at the server 24, can be utilized. In various embodiments, metadata may be provided for each data payload, for example, using a first data payload (1D) that includes a first metadata set (1M), and a second data payload (2D) that includes a second metadata set (2M), and so forth in a set of data payloads and metadata up to an Nth data payload (ND) which is accompanied by an Nth metadata set (NM), where N is a positive integer, D is a dataset, and M is a metadata set. In this manner, a server may match related (e.g. common sensor origin) and time related data payloads, to provide a consistent and ordered record of data from a triggering event.

For transfer of files between a remote device and a server, in an embodiment, a webhook may be utilized. When used in a webhook configuration, an authenticating step must be included by the server, or mutual authentication may be used, to insure that the communication is between an authorized server and an authorized and trusted remote device. Basically webhooks are "user defined HTTP callbacks" which may be initiated upon the occurrence of a "triggering event". When a triggering event occurs, a remote device makes an HTTP request to the URL configured for the webhook. The files may then be uploaded in real-time by the server via the designated URL configured for the webhook.

In an embodiment, the sensor data ingestion device 34 may include programmed instructions that, when executed, receives one or more inputs corresponding to one or more outputs from one or more sensors S1, S2, S3, etc., at a first device, such as stationary device 22 or mobile device 26. The sensor data ingestion device 34 receives an event input. The event input may be (a) received with notice that the event input corresponds to occurrence of a triggering event, or (b) may be processed, and by such processing, may be determined that the event input is a triggering event. Based on (1) at least one of the one or more inputs corresponding to one or more outputs from one or more sensors S1, S2, S3, S4, etc., and (2) the event input, the programmed instructions then are executed, to determine a result comprising whether or not to select to establish data transmission communication with the server 24 in real time, and in such case, the instructions select a time bounded range anchored to the triggering event, and stores in computer-readable media the available data for the time bounded range which is associated with the triggering event and with the one or more inputs from one or more sensors associated with a first device, (e.g. device 22 or 26). When communication with a server in real time for data transmission is selected, the instructions in the sensor data ingestion device 34 further prepares a plurality of time layered data packets and confirms existence or initiates existence of a persistent WebSocket connection for communication with the server 24 via the persistent WebSocket connection. In this manner, a plurality of time layered data packets are made available for download by the server 24 via the persistent WebSocket connection. Using the persistent WebSocket connection, a data stream of time layered data packets associated with the triggering event is provided to the server 24.

In various embodiments, the non-transitory computer-readable medium may contain programmed instructions that, when executed to determine a result that is a decision as to whether or not to select to establish data communication with a server in real time, is an ongoing iterative process, with respect to all incoming event data.

In an embodiment, the sensor data ingestion device 34 may further include a multiplexer. In such an embodiment, the non-transitory computer-readable medium included in the sensor data ingestion device 34 further includes programmed instructions that when executed multiplexes inputs from a plurality of inputs from the one or more inputs corresponding to a plurality of outputs from the one or more outputs from one or more sensors S1, S2, S3, etc. based on a time slot width and an allocation amongst a plurality of available time slots, by producing time layered data packets identified by time, sensor, and device. In various embodiments, the non-transitory computer-readable medium may receive one or more inputs corresponding to one or more outputs from one or more sensors S1, S2, S3, etc., at a first device (e.g. stationary device 22 or mobile device 26) further comprises receiving a at least two inputs corresponding to at least two outputs from at least two sensors S1, S2, at a first device (e.g. stationary device 22 or mobile device 26).

In an embodiment, the sensor data ingestion device 34 may include a non-transitory computer-readable medium wherein the programmed instructions, when executed, provide data packets comprising a data stream for download by the server 24. In such an embodiment, the data packets provided to the server 24 for download are configured for reconstitution by the server 24 into a continuous data stream, for review by a user 28, or for local storage at the server, or for remote storage in the cloud at an off-site data storage facility.

In an embodiment, the input(s) to the non-transitory computer-readable medium may be one or more inputs of video broadcast data. In an embodiment, the input(s) to the non-transitory computer-readable medium may be LiDAR broadcast data. In an embodiment, the input(s) to the non-transitory computer readable medium may be text data. In an embodiment, the input(s) to the non-transitory computer readable medium may be global positioning system (GPS) data.

In an embodiment, while communication between the sensor data ingestion device 34 and the server 24 is ongoing in real time via a persistent WebSocket connection, the plurality of time layered data packets available for download by the server 24 may accumulate so as to cause delay in supply to the server 24 beyond a selected time delay limit. In such case, the non-transitory computer readable medium may include instructions that, when executed, drop selected data packets from a queue of time layered data packets, thereby maintaining real time data packet availability. In such case, the selected data packets dropped from a transmission queue may be stored in computer-readable media. Additionally, the selected data packets dropped from a transmission queue and stored in computer-readable media may later be made available to a server 24 for download by server 24. In an embodiment, the selected data packets dropped from a transmission queue and stored in computer-readable media may be skipped video frames. In an embodiment, the selected data packets dropped from a transmission queue and stored in computer-readable media may be selected data from LiDAR data channels, or simply selected LIDAR point cloud data. In an embodiment, the selected data packets dropped from a transmission queue and stored in computer-readable media may be global positioning system (GPS) data.

In an embodiment, the non-transitory computer-readable medium included in the sensor data ingestion device 34 may include instructions that, when executed, generate a queue status for data associated with a triggering event, and then modifies queue status in accord with a programmed queue modification menu including one or more instances of a priority level choice. In an embodiment, the programmed instructions may further modify objects in a virtual queue of data associated with a plurality of triggering events.

In an embodiment, the non-transitory computer-readable medium may further include instructions that, when executed, broadcasts a notice of readiness to provide data in a virtual queue for download via the persistent WebSocket connection by a server 24. In various embodiments, the non-transitory computer-readable medium may include instructions that, when executed, provide a set of time layered data packages comprising LiDAR channel data, or LiDAR point cloud data, in a format available for download by a server 24 at a rate of up to about forty (40) megabytes per second. In various embodiments, the non-transitory computer-readable medium may include instructions that, when executed, provide a set of time layered data packages in a format available for download by a server 24 at a rate of about forty (40) megabytes per second, or more.

In additional to the ability of a sensor data ingestion device 34 to provide streaming data on a real time basis, the sensor data ingestion device 34 may also be configured to provide files at a very high data rate, e.g. in excess of forty (40) megabytes per second. In such an embodiment, the non-transitory computer-readable medium may further include instructions that, when executed, receive one or more inputs corresponding to one or more outputs from one or more sensors S1, S2, S3, etc. at a first device (e.g. devices 22 or 26). In such a case, the sensor data ingestion device 34 may receive an event input, which is (a) received with notice that the event input corresponds to occurrence of a triggering event, or (b) may be processed, and by such processing, may be determined that the event input is a triggering event.

Based on (1) at least one of the one or more inputs corresponding to one or more outputs from one or more sensors S1, S2, S3, S4, etc., and (2) the event input, the programmed instructions then are executed, to determine a result comprising whether or not to select to establish data transmission communication with the server 24 in real time. When the determination is made to contact the server 24 in real time, the programmed instructions select a time bounded range anchored to the triggering event, and stores in computer-readable media the data within the time bounded range that is associated with the triggering event and with the one or more inputs from one or more sensors S1, S2, etc. associated with the first device (e.g. device 22 or 26).

Figure 4:
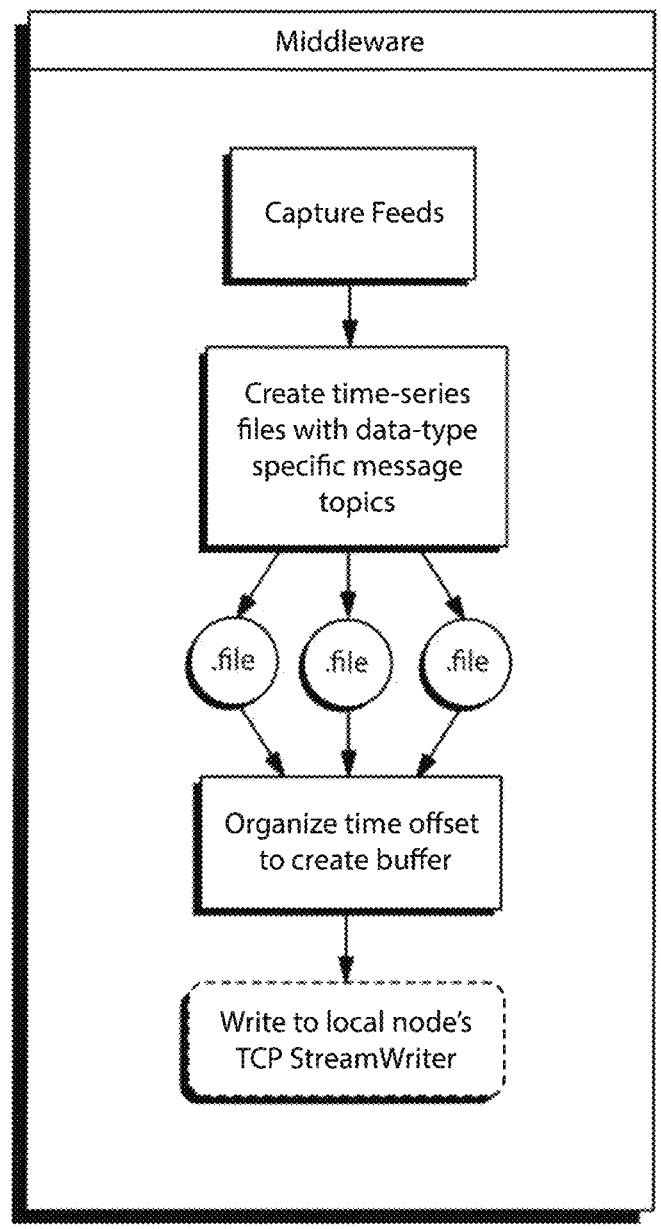
Figure 5:
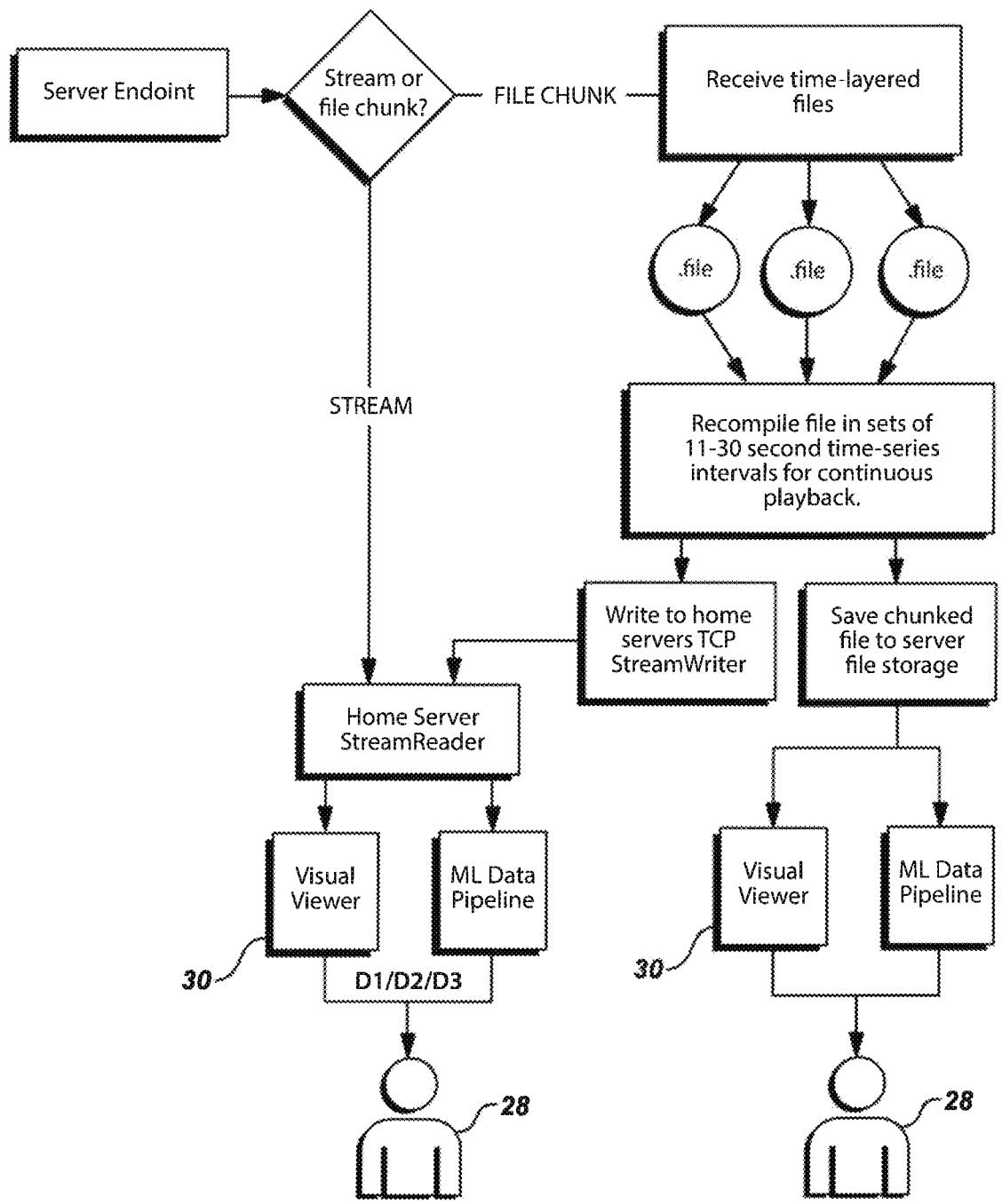
FIG. 5 is a diagrammatic representation of the processing of file streams or file chunks at a home server, showing how time layered files are recompiled into sets by time, which in an embodiment may be in lengths of time running from between about eleven (11) seconds to about thirty (30) second intervals, for continuous playback, and which may then be stored and viewed on demand, or may be viewed on a continuous basis, as well as provided to a machine learning ("ML") pipeline feed.
Figure 6:
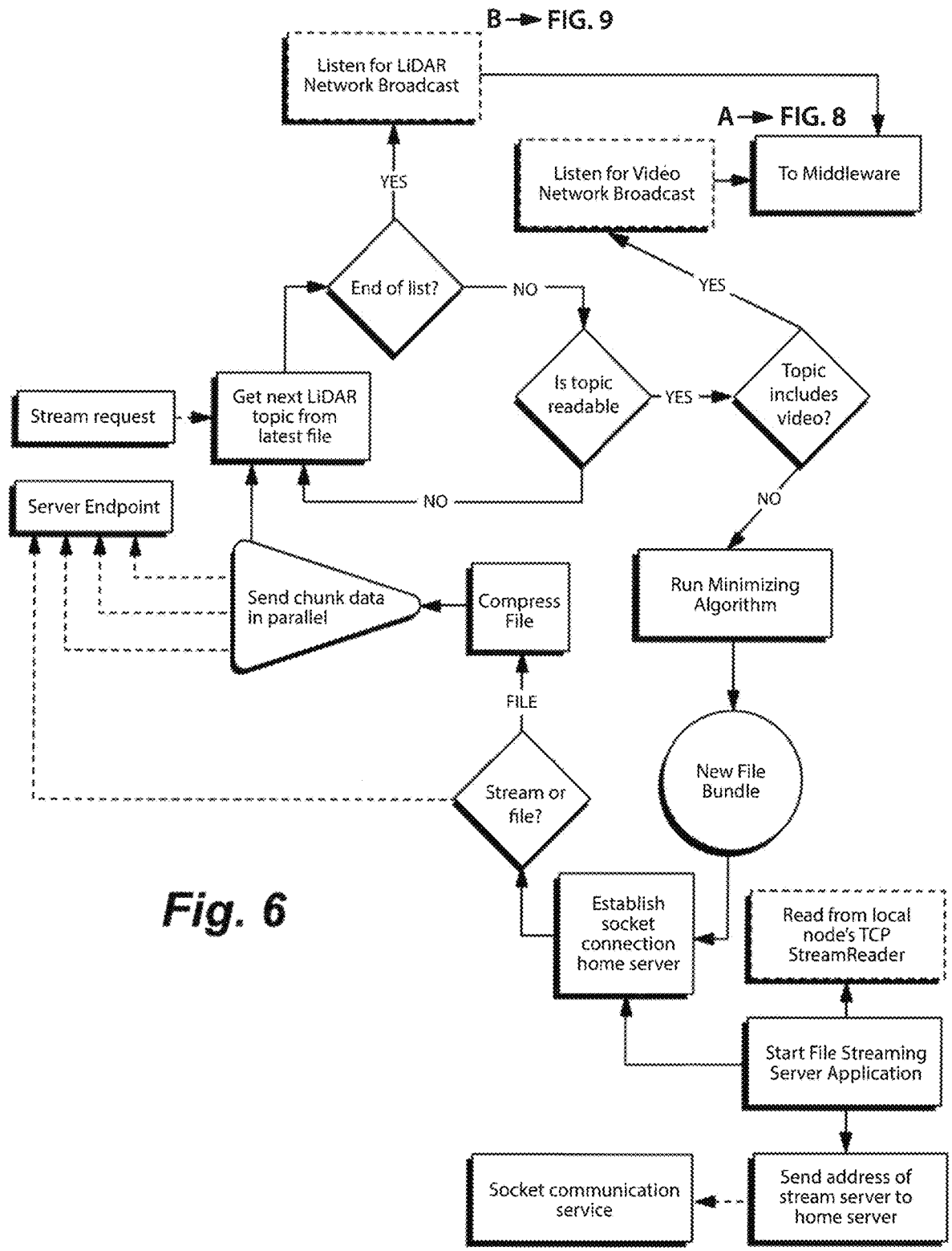
FIG. 6 is a diagrammatic representation of the processing of LiDAR point cloud data, and the processing of the LiDAR point cloud data and showing how on-board LiDAR point cloud data may be recorded, interrogated, transmitted via streaming, or in file chunks, to a home server.

When communication with a server 24 in real time is selected, the programmed instructions further capture the feeds of event data, prepare file chunks having a selected file data-type extension (_.file), as shown in FIG. 4. These file chunks with a selected file data-type extension are provided as a plurality of time layered data packets, and are organized in a memory buffer. The sensor data ingestion device 34 confirms the existence, or initiates existence, of a persistent webhook connection for communication with the server via the persistent webhook connection. The time layered data packets are stored in a memory buffer comprising computer-readable media, and made available for download by the server via the persistent webhook connection. The file chunks, made up of time layered data packets associated with the triggering event is provided to the server. Thus, the non-transitory computer-readable medium includes programmed instructions that when executed, provide data packets comprising sets of files which are file chunks, for download by the server. These data packets, as provided to the server 24 for download, are configured for reconstitution by the server 24 into sets of files having a selected file data-type extension, as shown in FIG. 5. In an embodiment, the non-transitory computer-readable may include programmed instructions that when executed multiplex inputs from a plurality of inputs from the one or more inputs corresponding to a plurality of outputs from the one or more outputs from one or more sensors S1, S2, S3, etc., based on a time slot width and an allocation amongst a plurality of available time slots, by producing time layered data packets identified by time, sensor, and device. In various embodiments, the execution of instructions to determine a result of whether or not to select to establish communication with a server 24 in real time to make files available for upload, is an iterative process. In various embodiments, at least two inputs are provided, corresponding to at least two outputs from one at least two sensors, S1 and S2, at a first device, such as device 22 or device 26. In an embodiment, the one or more inputs may be video broadcast data. In an embodiment, the one or more inputs may be selected data from LiDAR data channels, or simply selected LiDAR point cloud data. In an embodiment, the one or more inputs may be global positioning system (GPS) data. In an embodiment, the one or more inputs may be text data.

In an embodiment, when during communication with a server 24 in real time via a persistent webhook connection, a plurality of file chunks comprising of time layered data packets available for download by a server accumulate in a memory buffer so as to cause delay in supply to the server 24 beyond a selected time delay limit, selected data packets in the time layered data packets may be dropped from a transmission queue, to maintain real time data packet availability at the server. In such case, in an embodiment, the selected data packets dropped from a transmission queue may be stored for a selected storage time frame in computer-readable media memory buffer. In an embodiment, the selected data packets dropped from a transmission queue and stored in computer-readable media memory buffer may later be made available to a server 24 for download by a server 24. In an embodiment, the selected data packets dropped from a transmission queue and stored in computer-readable media may be skipped video frames. In an embodiment, the selected data packets dropped from a transmission queue and stored in computer-readable media may be data from selected LiDAR data channels, or a selected set of LiDAR point cloud data. In an embodiment, the selected data packets dropped from a transmission queue and stored in computer-readable media may be global positioning system (GPS) data.

In an embodiment, the non-transitory computer-readable medium may include instructions that, when executed, generate a queue status for data associated with a triggering event. Additionally, in an embodiment, the instructions may modify a queue status in accord with a programmed queue modification menu including one or more instances of a priority level choice. In such event, the instructions may modify objects in a virtual queue of data associated with a plurality of triggering events.

In various embodiments, the non-transitory computer-readable medium may include instructions that, when executed, broadcast a notice of readiness to provide data packets in a virtual queue, for download via the persistent webhook connection with a server 24. In an embodiment, the non-transitory computer-readable medium may include instructions that, when executed, provide a set of time layered data packages that include selected LIDAR channel data, or selected LiDAR point cloud data, in a format available for download by a server at a rate of up to about forty (40) megabytes per second. In an embodiment, the non-transitory computer-readable may further include instructions that, when executed, provide a time layered set of data packages in a format available for download by a server 24 at a rate of about forty (40) megabytes per second, or more. In an embodiment, the non-transitory computer-readable medium may further include instructions that, when executed, provide for the compression of at least some LiDAR point cloud data, or at least some data from selected LiDAR data channels, or both. In various embodiments, the non-transitory computer-readable medium may further include instructions that, when executed, provide a set of data packets comprising a plurality of .bag files having LiDAR point cloud data or video readable topics or both.

In an embodiment, a computer-based system to provide communication of event driven data between a server and a remote device may be provided. Such a system includes a server 24, a plurality of sensors S1, S2, S3, etc, and at least one remote device (e.g. device 22 or 26). The at least one remote device may include a computer-readable database and a sensor data ingestion device. A plurality of sensors may be connected to the sensor data ingestion device via a local network. In this manner, the computer-readable database is available for receipt and storage of sensor data from the plurality of sensors. The sensor data ingestion device 34 may include programmed instructions, that when executed, receive sensor data from the plurality of sensors. The sensor data may include event inputs. The event inputs, (a) may be received with notice that the event input corresponds to occurrence of a triggering event, or (b) may be processed, and may be determined upon processing that one or more of the event inputs is a triggering event. When the sensor data ingestion device 34 receives an event input indicating that the event data is a triggering event, or upon determining after processing the event data that an event input is a triggering event, executes programmed instructions to determine whether or not to establish communication with the server 24 in real time. In such case, the sensor ingestion device includes programmed instructions that selects a time bounded range anchored to the triggering event, and stores in computer-readable media the data within the time bounded range which is associated with triggering event and with the one or more event inputs from the plurality of sensors.

In the case that communication with a server in real time is selected, the sensor data ingestion device further prepares a plurality of time layered data packets and confirms the existence, or initiates existence, of a persistent WebSocket connection for communication with the server via the persistent WebSocket connection. The time layered data packets are made available for download by the server via the persistent WebSocket connection. Thus, a data stream made up of at least the time layered data packets associated with data from one or more sensors which provide the triggering event are made available to the server for download. As noted above, the sensor data ingestion device may include a multiplexer. In such case, the sensor data ingestion device includes programmed instructions which multiplexes data inputs from a plurality of data inputs from the plurality of sensors. The data inputs correspond to a plurality of outputs from the plurality of sensors S1, S2, S3, etc. and the multiplexing may be based on a time slot width and an allocation amongst a plurality of available time slots, by producing time layered data packets identified by time, sensor, and remote device associated with specific sensors S1, S2, S3, and the like. In an embodiment, the programmed instructions, when executed, may provide data packets which include a stream for download by the server, and wherein the data packets provided to the server for download are configured for reconstitution by the server into a continuous data stream.

In various embodiments, the computer-based system includes programmed instructions that perform an iterative process to determine a result comprising whether or not to select to establish communication with a server in real time. In an embodiment, the process of receiving data inputs corresponding to outputs from a plurality of sensors may include receiving at least three inputs corresponding to at least three outputs from the plurality of sensors located at the selected remote device. In an embodiment, the data inputs may video broadcast data. In an embodiment, the sensor data may include LiDAR point cloud data, or data from selected LiDAR channels. In an embodiment, the sensor data may include text data. In an embodiment, the sensor data may include global positioning system (GPS) data.

In an embodiment, a computer-based system may experience a period of time when, during communication with the server in real time via the persistent WebSocket connection, the plurality of time layered data packets available for download by a server accumulate so as to cause delay in supply to the server beyond a selected time delay limit. In such as situation, selected data packets in the plurality of time layered data packets may be dropped from a transmission queue, to maintain real time data packet availability. In such case, the selected data packets dropped from a transmission queue may be stored in a memory buffer, i.e. in the non-transitory computer-readable media at the remote device. Thus, the selected data packets dropped from a transmission queue and stored in the computer-readable media are saved, and may be later made available to the server for download. In an embodiment, the selected data packets dropped from a transmission queue and stored in computer-readable media may include selected LiDAR data channels, or selected LiDAR point cloud data, or both.

In summary, a computer-based system may be provided which includes a sensor data ingestion device 34. In an embodiment, the sensor ingestion device 34 may be on-board a mobile device 26 such as an autonomous vehicle. In an embodiment, the sensor data ingestion device 34 may be located at a stationary device 22, such as at a video camera location.

The sensor data ingestion device 34 may include a memory buffer 38 having a computer-readable memory. Computational circuitry and programmed instructions may provide a queue unit including computational circuitry configured to generate a queue status associated with triggering event data arrives at the sensor data ingestion device 34, and/or is stored in the memory buffer 38, and to present a queue modification menu including one or more instances of a priority level choice. The sensor data ingestion device 34 may further include a queue controller including computational circuitry configured to modify objects in a virtual queue of triggering event data from a plurality of devices associated with a plurality of messages. The queue controller may be responsive to receiving one or more inputs indicative of a user priority level choice amongst the plurality of messages. In an embodiment, a server 24 may be configured to broadcast a notice of readiness to download triggering event data from the virtual queue. The server may include computational circuitry having a WebSocket configured to request the download of triggering event data files via the WebSocket. The computational circuitry provides data packets each comprising a portion of an original triggering event data, wherein the data packets downloaded by the server are reconstituted into a duplicate of the original triggering event data.

Additionally, when files are received by the sensor data ingestion device 34, the computer-based system may further include computational circuitry in the queue controller configured to create triggering event data file packages made up of file chunks from triggering event data. The file chunks may include a plurality of time layered files, each one of the plurality of time layered files including a portion of a triggering event data file package. The file chunks may be placed in a virtual queue in the memory buffer, as seen in FIG. 4. The server is configured to broadcast a notice of readiness to download file chunks from the virtual queue, and the server includes computational circuitry for set up of a webhook configured to request the download of the plurality of time layered files. In an embodiment, as seen in FIG. 5 the plurality of time layered files downloaded by the server are reconstituted into a duplicate of original triggering event data file packages, which may be retained in server file storage. In an embodiment, the time layered files may include a plurality of files having LiDAR point cloud topics therein. In an embodiment, the time layered files may include a plurality of files having video readable topics therein. In an embodiment, the system may further include a visual viewer, and in such case, the visual viewer may be configured to render the streaming data for review by a user 28.

In an embodiment, the queue controller may be further configured to interrogate each triggering event data package to determine whether or not the triggering event data package indicates occurrence of a new event. In an embodiment, a computer-based system may be provided wherein the server 24 further includes one or more machine learning algorithms. In such case, the streaming data may be processed by the machine learning algorithm. This may be especially useful establishing new criteria for processing new triggering events.

In an embodiment, the server may download triggering event data as a plurality of .bag files organized by time, wherein each .bag file contains a portion of an original triggering event data file package. In various embodiments, for each new event, the plurality of time layered .bag files may include a plurality of .bag files having LiDAR point cloud data. In an embodiment the .bag files may include video readable topics. In any event, the triggering event data may be captured by a node file handler and downloaded by the server.

In an embodiment, the queue controller may be configured to modify the virtual queue arrangement of one or more of the triggering event data file packages, responsive to instructions indicative of importance of a triggering event type assigned by the queue controller to a triggering event data file package.

In an embodiment, a computer-based system may include a server 24 may have a graphical user interface display 30 configured to present one or more instances of a virtual representation of the queue status associated with a triggering event data package. In an event, the server may include a graphical user interface display configured to present a queue modification menu including one or more instances of the priority level choice.

In an embodiment, a computer-based system may include a server that is made up of a group of workers W which, taken together, provide a server 24. In an embodiment, the group of workers W may be configured to receive, in parallel, streaming data from the sensor data ingestion device 34. Similarly, a server may be made up of a group of workers W that are configured to receive, in parallel, file chunks from the sensor data ingestion device 34.

Persons of ordinary skill in the art may appreciate that numerous design configurations may be possible to enjoy the functional benefits of the inventive systems described herein. Thus, given the wide variety of configurations and arrangements of embodiments of the present invention the scope of the invention is reflected by the breadth of the claims below rather than as might be narrowed by the embodiments described above. In the foregoing description, numerous details have been set forth in order to provide a thorough understanding of the disclosed exemplary embodiments for data payload delivery systems. However, certain of the described details may not be required in order to provide useful embodiments, or to practice a selected or other disclosed embodiments. Various steps or operations in method(s) described herein may have been described as multiple discrete operations, in turn, in a manner that is most helpful in understanding the method(s). However, the order of description should not be construed as to imply that such operations are necessarily order dependent. In particular, certain operations may not need to be performed in the order of presentation. And, in different embodiments, one or more operations may be performed simultaneously, or eliminated in part or in whole while other operations may be added. Also, the reader will note that the phrase "in one embodiment" has been used repeatedly. This phrase generally does not refer to the same embodiment; however, it may. Finally, the terms "comprising", "having" and "including" should be considered synonymous, unless the context dictates otherwise. Various aspects and embodiments described and claimed herein may be modified from those shown without materially departing from the novel teachings and advantages provided by this invention, and may be embodied in other specific forms without departing from the spirit or essential characteristics thereof. Embodiments presented herein are to be considered in all respects as illustrative and not restrictive or limiting. This disclosure is intended to cover methods, systems, and apparatus described herein, and not only structural equivalents thereof, but also equivalent structures. Modifications and variations are possible in light of the above teachings. Therefore, the protection afforded to this invention should be limited only by the claims set forth herein, and the legal equivalents thereof.

The invention claimed is:

1. A non-transitory computer readable medium having Instructions that, when executed:
    receives one or more inputs corresponding to one or more outputs from one or more sensors at a first device;
    receives an event input, and wherein the event input
        (a) is received with notice that the event input corresponds to occurrence of a triggering event: or
        (b) is processed, and is determined upon processing that the event input is a triggering event:
    based (1) at least one of the one or more inputs and (2) the event input, executes programmed instructions to determine a result comprising whether or not to select to establish communication with a server in real time, and in such case, selects a time bounded range anchored to the triggering event and stores in computer-readable media data for the time bounded range which is associated with the triggering event and with the one or more inputs from one or more sensors associated with the first device:
    wherein in the case communication with a server in real time is selected, further prepares a plurality of time layered data packets and confirms existence or initiates existence of a persistent connection for communication with the server via the persistent connection, whereby the plurality of time layered data packets are made available for download by the server via the persistent connection;
    wherein a data stream of time layered data packets associated with the triggering event is provided to the server:
    wherein during communication with a server in real time via a persistent connection the plurality of time layered data packets available for download by a server accumulate so as to cause delay in supply to the server beyond a selected time delay limit, selected data packets in the time layered data packets are dropped from a transmission queue, to maintain real time data packet availability; and
    wherein the programmed instructions, when executed multiplexes inputs from a plurality of inputs from the one or more inputs corresponding to a plurality of outputs from the one or more outputs from one or more sensors, based on a time slot width and an allocation amongst a plurality of available time slots, by producing time layered data packets identified by time, sensor, and device.

2. The non-transitory computer-readable medium of claim 1, wherein the programmed instructions, when executed, provide data packets comprising a stream for download by the server, and wherein the data packets provided to the server for download are configured for reconstitution by the server into a continuous data stream.

3. The non-transitory computer-readable medium of claim 1, wherein executing programmed instructions to determine a result comprising whether or not to select to establish communication with a server in real time comprises an iterative process.

4. The non-transitory computer-readable medium of claim 1, wherein receiving one or more inputs corresponding to one or more outputs from one or more sensors at a first device further comprises receiving at least two inputs corresponding to at least two outputs from at least two sensors at a first device.

5. The non-transitory computer-readable medium of claim 1, wherein the one or more inputs comprises LiDAR broadcast data.

6. The non-transitory computer-readable medium of claim 1, wherein selected data packets dropped from a transmission queue are stored in computer-readable media, and where the selected data packets comprise selected LIDAR data channels.

7. The non-transitory computer-readable medium of claim 1, further comprising instructions that, when executed,
    generates a queue status for data associated with a triggering event; modifies queue status in accord with a programmed queue modification menu including one or more instances of a priority level choice; and
    modifies objects in a virtual queue of data associated with a plurality of triggering events.

8. The non-transitory computer-readable medium of claim 7, further comprising instructions that, when executed, broadcasts a notice of readiness to provide data in a virtual queue for download via the persistent connection with a server.

9. A computer-based system, comprising:
    a sensor data ingestion device, the sensor data ingestion device having a memory buffer comprising a computer-readable memory, and a queue unit including computational circuitry configured to generate a queue status associated with triggering event data stored in the memory buffer and to present a queue modification menu Including one or more instances of a priority level choice:
    the sensor data ingestion device further comprising a queue controller including computational circuitry configured to modify objects in a virtual queue of triggering event data from a plurality of devices associated with a plurality of messages, and wherein the queue controller is responsive to receiving one or more inputs indicative of a user priority level choice amongst the plurality of messages:
    a server configured to broadcast a notice of readiness to download triggering event data from the virtual queue, wherein the server comprises computational circuitry configured to request the download of triggering event data files, and wherein the computational circuitry provides data packets each comprising a portion of an original triggering event data, wherein the data packets downloaded by the server are reconstituted into a duplicate of the original triggering event data;
    wherein the computer-based system further comprises computational circuitry in the queue controller configured to create triggering event data file packages comprising file chunks from triggering event data, the file chunks comprising a plurality of time layered files, each one of the plurality of time layered files comprising a portion of a triggering event data file package, and wherein the file chunks are placed in a virtual queue in the memory buffer:
    wherein the server is configured to broadcast a notice of readiness to download file chunks from the virtual queue, wherein the server comprises computational circuitry configured to request the download of the plurality of time layered files; and wherein the plurality of time-layered files downloaded by the server are reconstituted into a duplicate of original triggering event data file packages, and wherein the time layered files comprise a plurality of files having LIDAR point cloud data or video data readable topics therein; and wherein the server downloads triggering event data as streaming data.

10. The computer-based system of claim 9, further comprising a visual viewer, wherein the visual viewer is configured to render the streaming data.

11. The computer-based system of claim 10, wherein the server further comprises a machine learning algorithm, and wherein the streaming data is processed by the machine learning algorithm.

12. The computer-based system of claim 9, wherein the queue controller is further configured to interrogate each triggering event data package to determine whether or not the triggering event data package indicates occurrence of a new event.

13. The computer-based system of claim 9, wherein the server sends or receives, or sends and receives at the same time the triggering event data as a plurality of files organized by time, each file comprising a portion of an original triggering event data file package.

14. The computer-based system of claim 13, wherein for each new event, the plurality of time layered files comprising a plurality of files having LiDAR point cloud data or video data readable topics on the triggering event are captured by a node file handler and downloaded by the server.

15. The computer-based system of claim 9, wherein the server comprises a group of workers which, taken together, provide a server, and wherein the group of workers are configured to receive, in parallel, streaming data from the sensor data ingestion device.

* * * * *